(12) United States Patent
Western et al.

(10) Patent No.: US 11,273,919 B2
(45) Date of Patent: **\*Mar. 15, 2022**

(54) PARACHUTE ARCHITECTURE FOR LOW-ALTITUDE VTOL AIRCRAFT

(71) Applicant: Kitty Hawk Corporation, Palo Alto, CA (US)

(72) Inventors: Craig Western, San Francisco, CA (US); Amy Qian, Sunnyvale, CA (US); Damon Vander Lind, Alameda, CA (US); Timothy Mattson, San Jose, CA (US); Eric Miller, Santa Cruz, CA (US); Peter A. Swan, West Sacramento, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 16/560,879

(22) Filed: Sep. 4, 2019

(65) Prior Publication Data

US 2020/0047892 A1  Feb. 13, 2020

Related U.S. Application Data

(63) Continuation of application No. 16/381,898, filed on Apr. 11, 2019, now Pat. No. 10,464,681.
(Continued)

(51) Int. Cl.
*B64D 17/80* (2006.01)
*B64D 17/54* (2006.01)
*B64D 17/72* (2006.01)

(52) U.S. Cl.
CPC ............. *B64D 17/80* (2013.01); *B64D 17/54* (2013.01); *B64D 17/725* (2013.01)

(58) Field of Classification Search
CPC ................................ B64D 17/80; B64D 17/74
See application file for complete search history.

(56) References Cited

U.S. PATENT DOCUMENTS

| 3,776,493 A | 12/1973 | Matsuo |
| 3,913,873 A | 10/1975 | Nimylowycz |

(Continued)

FOREIGN PATENT DOCUMENTS

| CH | 593170 A5 * 11/1977 ............. B64D 17/80 |
| CN | 113148120 A * 7/2021 |

(Continued)

OTHER PUBLICATIONS

Author Unknown, Apollo (spacecraft), Wikipedia, Jul. 9, 2018, https://en.wikipedia.org/wiki/Apollo_(spacecraft).
(Continued)

*Primary Examiner* — Brian M O'Hara
(74) *Attorney, Agent, or Firm* — Van Pelt, Yi & James LLP

(57) ABSTRACT

In an embodiment, a system to deploy a plurality of parachutes includes a plurality of parachute canopies each packed in a canister, a plurality of rockets adapted to extract an associated canopy from the canister, and a controller. The controller is configured to determine that an aircraft is at least one of: in a hover mode of operation and a forward flight mode of operation. In response to the determination that the aircraft is in the hover mode of operation, the controller applies a hover deployment sequence including by instructing the plurality of parachutes to deploy substantially simultaneously. In response to the determination that the aircraft is in the forward mode of operation and above a threshold airspeed, the controller applies a forward deployment sequence including by instructing the plurality of parachutes to deploy in a predefined sequence.

19 Claims, 30 Drawing Sheets

Related U.S. Application Data

(60) Provisional application No. 62/718,173, filed on Aug. 13, 2018.

(56) References Cited

U.S. PATENT DOCUMENTS

| | | | |
|---|---|---|---|
| 4,004,764 | A | 1/1977 | Burklund |
| 4,428,102 | A | 1/1984 | Brownell |
| 4,637,577 | A | 1/1987 | Miseyko |
| 5,005,785 | A | 4/1991 | Puskas |
| 5,878,979 | A | 3/1999 | Fisher |
| 5,899,414 | A | 5/1999 | Duffoo |
| 6,487,951 | B1 | 12/2002 | Lazarov |
| 7,118,073 | B2 | 10/2006 | Booth |
| 8,074,934 | B2 | 12/2011 | Fradet |
| 10,059,459 | B2 | 8/2018 | Clark |
| 2013/0175398 | A1* | 7/2013 | Chia ............... B64D 25/12 244/139 |
| 2015/0314881 | A1 | 11/2015 | Tsaliah |
| 2016/0251083 | A1 | 9/2016 | Tsaliah |
| 2017/0233086 | A1 | 8/2017 | Homan |

FOREIGN PATENT DOCUMENTS

| | | |
|---|---|---|
| DE | 3329490 | 3/1985 |
| FR | 2989064 | 4/2016 |

OTHER PUBLICATIONS

Author Unknown, BRS-182 System Description, Dec. 2, 2004, pp. 1-11, Ballistic Recovery Systems, Inc.

Author Unknown, Galaxy GRS Ballistic Parachute Rescue System Instruction Manual for Assembly and Use, Mar. 21, 2016, pp. 1-41.

Author Unknown, High-Altitude Military Parachuting, Wikipedia, Jul. 31, 2018, https://en.wikipedia.org/w/index.php?title=High-altitude_military_parachuting&oldid=852804608.

Author Unknown, Magnum Ballistic Rescue Parachute Systems Series Magnum Installation and User's Manual, Feb. 2014, pp. 1-68.

Author Unknown, Mk12 Ejection Seat, Martin-Baker.com, Aug. 9, 2018.

Author Unknown, Slider (parachuting), Wikipedia, Oct. 28, 2016, https://en.wikipedia.org/w/index.php? title=Slider_(parachuting)&oldid=746685769.

Author Unknown, Soyuz (spacecraft), Wikipedia, Aug. 10, 2018, https://en.wikipedia.org/wiki/Soyuz_(spacecraft).

Author Unknown, SpaceX Dragon, Wikipedia, Aug. 6, 2018, https://en.wikipedia.org/wiki/SpaceX_Dragon.

Theo W. Knacke, Parachute Recovery Systems Design Manual, Mar. 1991, pp. 5-42, 5-43, 5-121 to 5-130, 6-10, and 6-38 to 6-40, Para Publishing.

* cited by examiner

Hovering

Forward Flight

PARACHUTE ARCHITECTURE FOR LOW-ALTITUDE VTOL AIRCRAFT

CROSS REFERENCE TO OTHER APPLICATIONS

This application is a continuation of co-pending U.S. patent application Ser. No. 16/381,898, entitled PARACHUTE ARCHITECTURE FOR LOW-ALTITUDE VTOL AIRCRAFT filed Apr. 11, 2019, which claims priority to U.S. Provisional Patent Application No. 62/718,173, entitled PARACHUTE ARCHITECTURE FOR LOW-ALTITUDE VTOL AIRCRAFT filed Aug. 13, 2018, both of which are incorporated herein by reference for all purposes.

BACKGROUND OF THE INVENTION

New types of aircraft are being developed that take off and land vertically. While airborne, these new types of aircraft can hover mid-air, or fly forwards along some path. These new types of aircraft also fly relatively low to the ground. New types of safety devices which are specifically designed for such aircraft would be desirable.

BRIEF DESCRIPTION OF THE DRAWINGS

Various embodiments of the invention are disclosed in the following detailed description and the accompanying drawings.

FIG. 16 is a diagram illustrating an embodiment of a cutter with a channel to thread the latch restrainer through.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a parachute system are described herein. First, a process for performing a deployment sequence using a parachute system is described. These parachute systems are designed for certain types of aircraft. For context, an example aircraft is described next. Then, once the example aircraft is described, various embodiments of the parachute system which satisfy the specific constraints of the exemplary aircraft are described.

Figure 1:
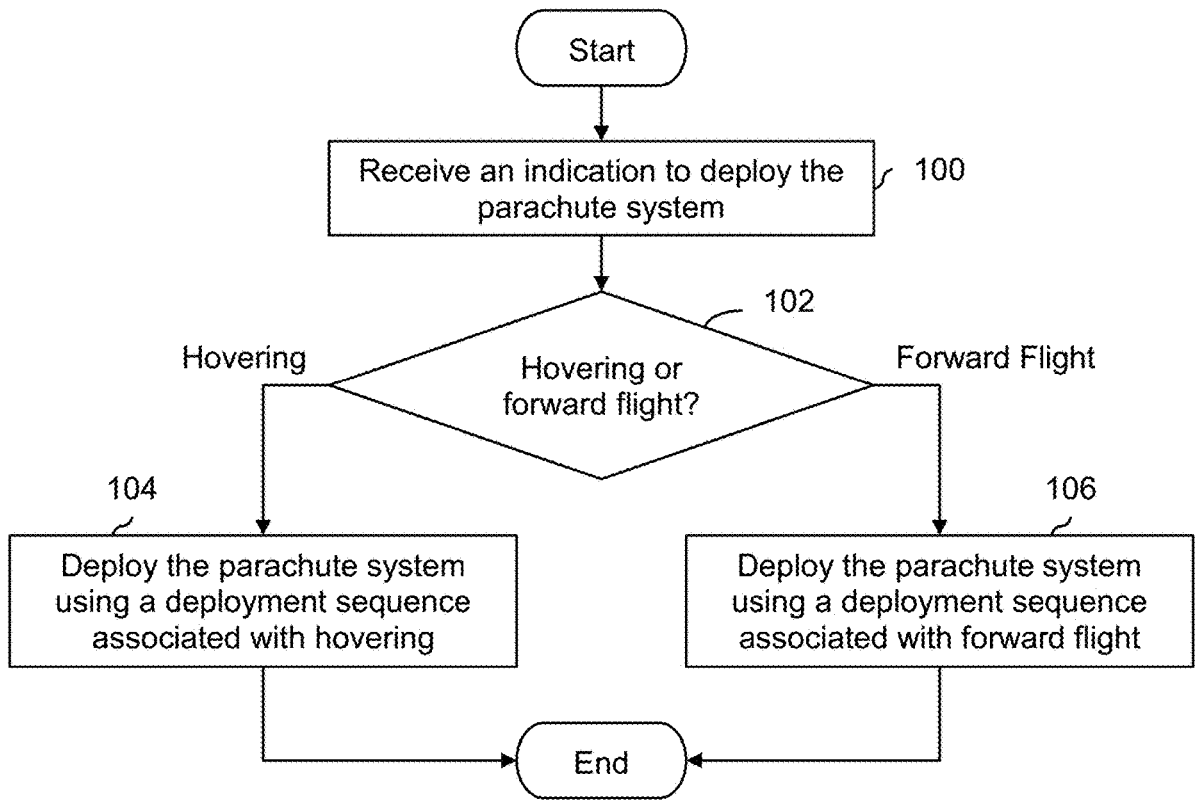
FIG. 1 is a flowchart illustrating an embodiment of a process to perform a deployment sequence associated with hovering or one associated with forward flight above a certain airspeed depending upon the aircraft's state.

FIG. 1 is a flowchart illustrating an embodiment of a process to perform a deployment sequence associated with hovering or one associated with forward flight above a certain airspeed depending upon the aircraft's state. In some embodiments, the process is performed by the controller (e.g., a control board) of the parachute system.

At 100, an indication to deploy the parachute system is received. For example, the main flight computer or controller may generate a signal when it determines that a crash or hard landing is imminent and the parachute system should be deployed, or that a critical fault has occurred. Any appropriate technique to detect an emergency or failure may be employed. This signal may be sent from the main flight computer to the parachute controller, or may be manually commanded by the pilot. A command to deploy may also occur if the parachute controller determines that the main flight computer is unresponsive.

At 102, it is determined if the aircraft is hovering or in forward flight above a certain airspeed. For example, in addition to the deployment indication received at 100, the main flight computer may also send one or more signals from which the hovering versus forward flight state may be determined. In one example, the signal exchanged is a binary signal where 0=hovering and 1=forward flight above a certain airspeed. Alternatively, the main flight computer may send state information (e.g., position, velocity, acceleration, or other measurements) and the parachute may decide for itself which state the aircraft is in. In some embodiments, an estimate or sensor measurement of the airspeed is received at step 102.

If it is determined at step 102 that the aircraft is in a hovering mode (e.g., because the aircraft's forward speed and/or lateral speed is substantially zero, if the airspeed measurement or estimate is below a certain airspeed, etc.), then the parachute system is deployed using a deployment sequence associated with hovering at 104.

Figure 7A:
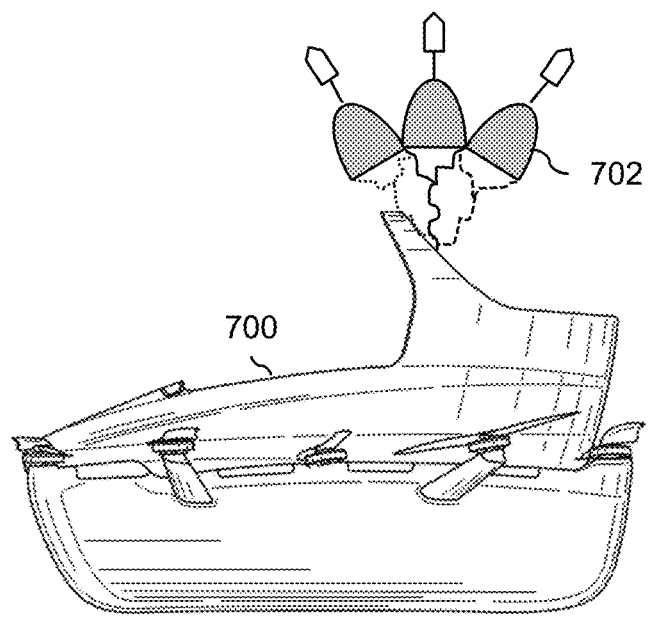
FIG. 7A shows the example multicopter in a hovering state as the three parachutes are simultaneously deployed.
Figure 7B:
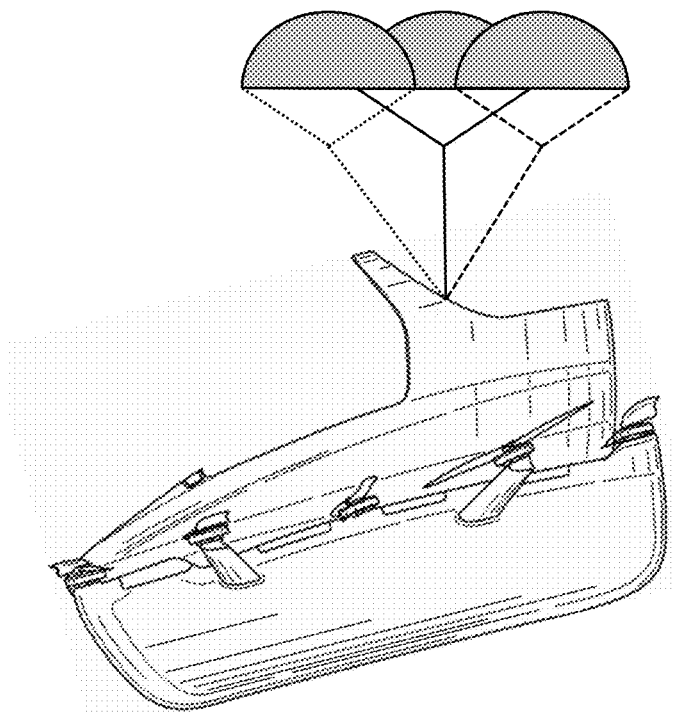
FIG. 7B shows the system after the three parachutes are fully deployed.

In one example of a deployment sequence associated with hovering, all of the (e.g., individual) parachute canisters are ignited or deployed at the same time. See, for example, FIG. 7A and FIG. 7B. FIG. 7A shows the example multicopter in a hovering state (700) as the three parachutes (702) are simultaneously deployed. FIG. 7B shows the system after the three parachutes are fully deployed.

Figure 8A:
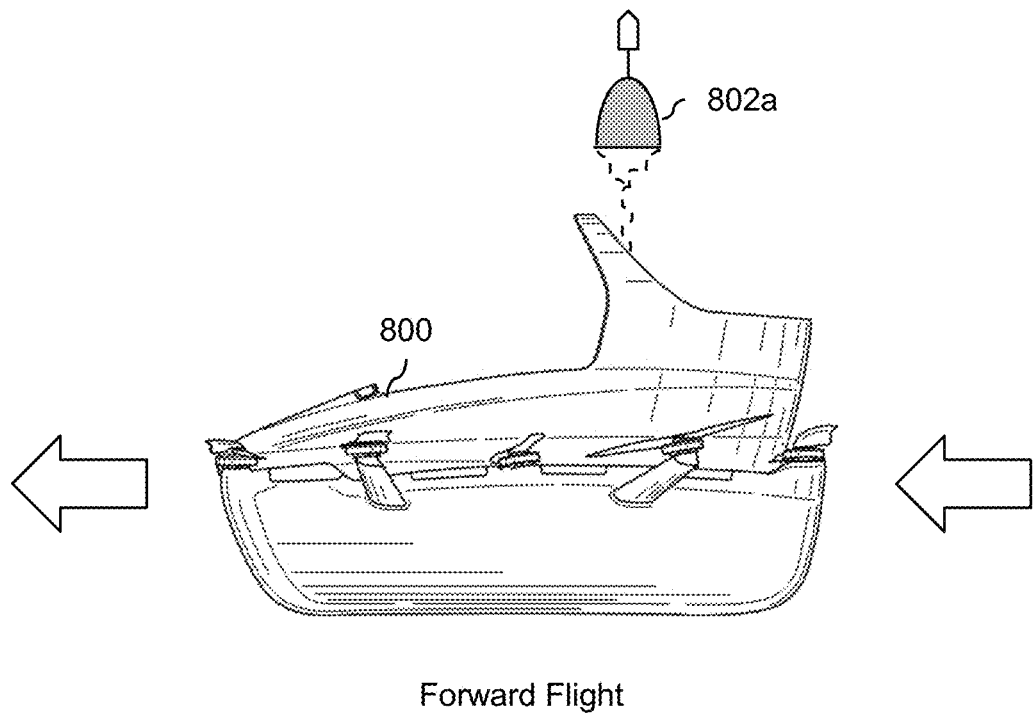
FIG. 8A shows the system when a first parachute begins to deploy.
Figure 8B:
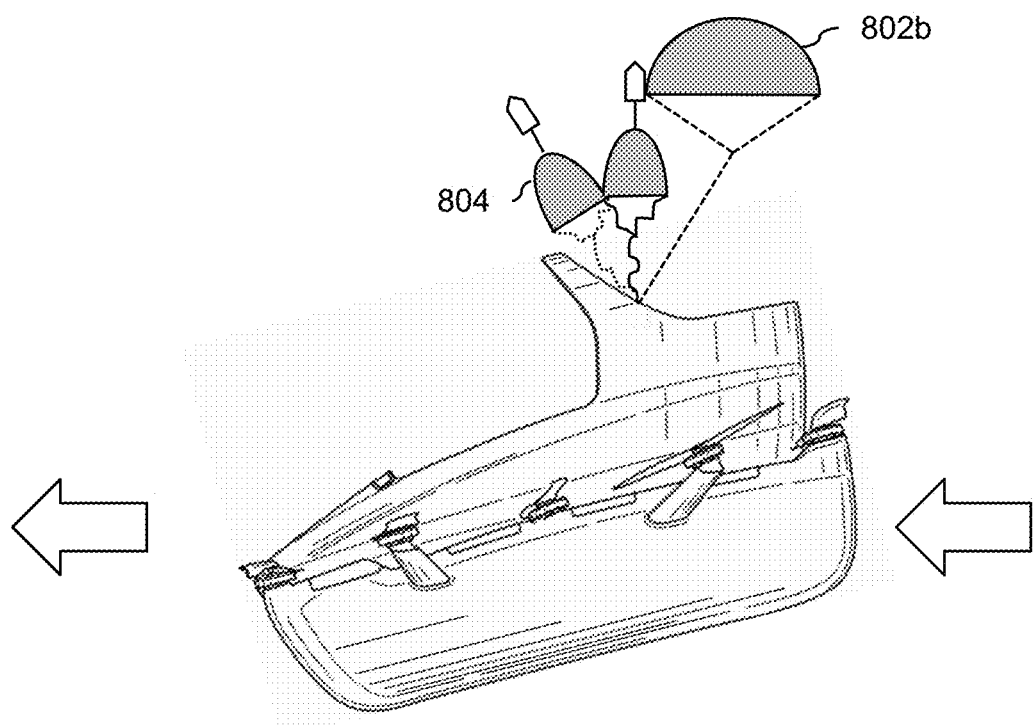
FIG. 8B shows the system after the first parachute has fully deployed.

Returning to FIG. 1, if it is determined at 102 that the aircraft is in a forward flight mode above a certain airspeed, then the parachute system is deployed using a deployment sequence associated with forward flight. See for example, FIG. 8A and FIG. 8B. FIG. 8A shows the system when a first parachute begins to deploy. The parachute can begin to deploy (802a) when a multicopter (800) is in a forward flight above a certain speed. For example, in FIG. 6, the rearmost parachute (600b) may be deployed first because the angle of the rearmost parachute points more downwind than the other two parachutes (i.e., its angle of attack is smaller), increasing its chances of successful inflation. FIG. 8B shows the system after the first parachute (802b) has fully deployed. After the vehicle has stabilized under the first parachute, the two forward rockets are ignited, their trajectories designed to clear the vertical axis and canopy under which the vehicle is hanging. The angles of the forward two rockets may be chosen such that the rockets travel to the left and the right of the inflated canopy when ignited after the first parachute and vehicle have stabilized, minimizing chances of striking the inflated canopy. These angles may be chosen according to the designed vehicle hang angle under one canopy and the allowable oscillation of a single parachute. The angle of the rearmost rocket, forward two rockets, and/or central axis of the three rocket vectors may also be designed to maximize chances of successful fast inflation both in forward flight and in hover. Lower angle of attack at high speed (angling toward the rear of the vehicle) maximizes chances of normal inflation at high speed, but angling vertically reduces time and distance required for inflation when parachutes are deployed in hover. As an alternate and faster method of deploying the two forward parachutes, the airstream due to the forward movement of the multicopter will cause the first parachute to be pulled slightly behind the multicopter. This creates space above the cluster of parachutes so that the second and third parachutes (804) can be deployed. This sequential deployment of the parachutes applies deceleration loading over a longer amount of time and prevents simultaneous parachute openings, reducing peak loading on the pilot at high speed. Sequential deployment also helps to avoid entanglement of the lines and/or canopies if all three parachutes were deployed simultaneously at high speed. In some embodiments, some other sequence (e.g., two at first, then the third; each deployed separately; etc.) is used. The following figure shows an example of an aircraft in which a process to perform a parachute deployment sequence can be performed.

Figure 2:
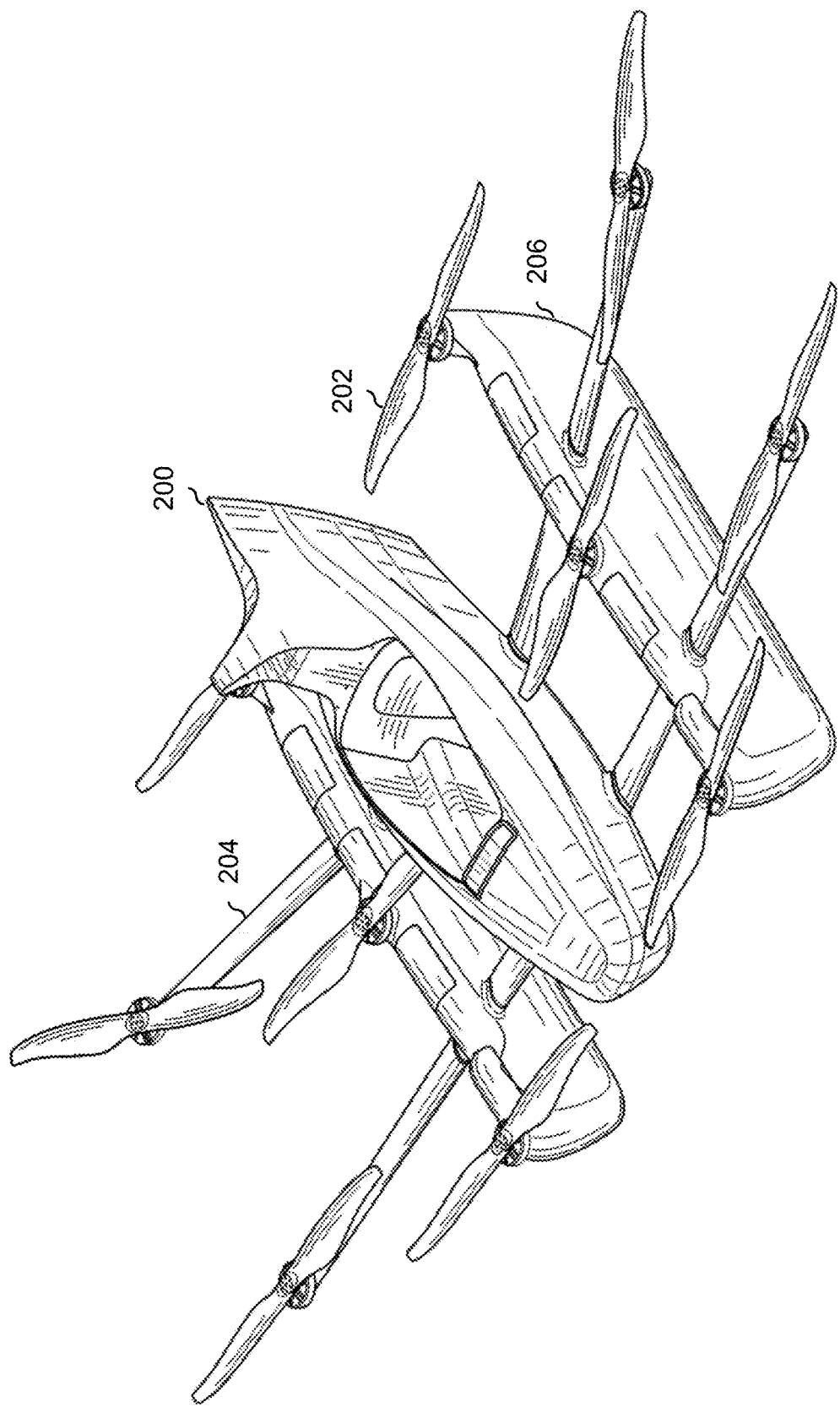
FIG. 2 is a diagram illustrating an embodiment of a low-altitude, vertical takeoff and landing multicopter.

FIG. 2 is a diagram illustrating an embodiment of a low-altitude, vertical takeoff and landing multicopter. In this example, multicopter 200 has an open-air cockpit and could be designed to spend a significant portion of its flight time below a few hundred feet. This is a relatively low altitude compared to other types of aircraft and (as will be described in more detail below) if a parachute system is used with such an aircraft, the parachute's canop(y/ies) should fully inflate quickly in order to minimize any initial vertical drop before the parachute system engages and slows the descent of the aircraft. In contrast, an aircraft that flies at higher altitudes can tolerate more of a vertical drop before the canop(y/ies) inflate and slow the aircraft's descent.

The multicopter in this example has 10 rotors (202) which rotate about substantially vertical axes. This exemplary aircraft has booms (204) and floats (206) to which the rotors are attached. The booms and floats do not collectively produce enough aerodynamic lift for wing-borne flight, even if the aircraft is flying forwards at a relatively high speed. To put it another way, the exemplary aircraft does not have wings and cannot glide to the ground in the event of a complete loss of power or other emergency. For this reason, a parachute system or other safety devices which can be deployed in an emergency would be desirable.

The following figure shows an example flight of the exemplary multicopter shown here.

Figure 3:
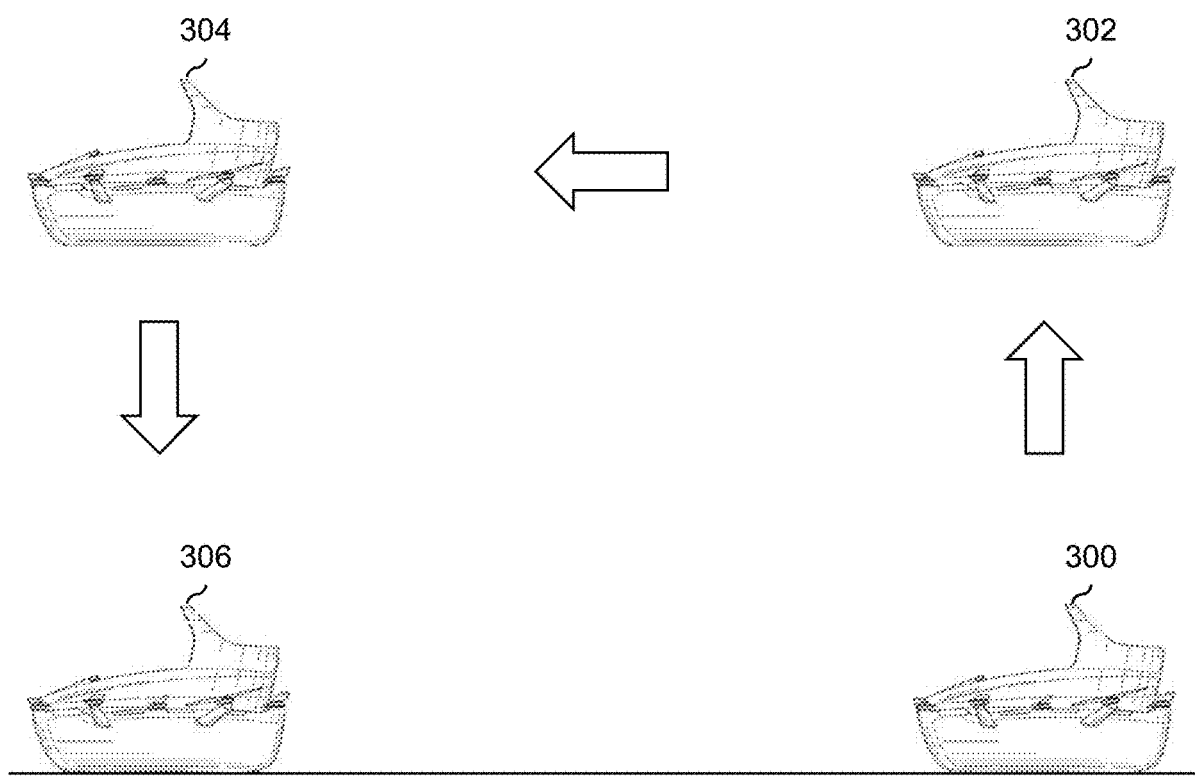
FIG. 3 is a diagram illustrating an example of a flight path which includes hovering and forward flight.

FIG. 3 is a diagram illustrating an example of a flight path which includes hovering and forward flight. In this example, multicopter 300 begins on the ground. In this example flight, the multicopter takes off vertically and ascends vertically. As the multicopter gets closer to some desired cruising altitude, the multicopter slows its vertical ascent until it comes to a stop, hovering mid-air (302).

From the hovering position (302), the multicopter transitions from hovering mode or style of flight to a flying forward mode or style of flight (e.g., where the multicopter flies within some 2D plane at a relatively constant altitude). In this example, the aircraft has a maximum speed on the order of 55 knots. As described above, the multicopter is designed to fly at relatively low altitudes and so this cruising altitude may be relatively low compared to other types of aircraft (e.g., with enclosed and/or pressurized cockpits).

Once the multicopter gets close to some desired destination, the multicopter comes to a forward stop and hovers in the air (304). The multicopter then descends vertically to perform a vertical landing and lands on the ground (see multicopter 306).

Due to the relatively low flying altitude of the multicopter, a parachute system which is used in the exemplary aircraft should preferably deploy quickly and/or with very little vertical drop before full inflation of the canop(y/ies) slows the descent of the aircraft. To put it another way, there is very little margin for any vertical drop before the parachute system needs to slow the aircraft down in order to avoid a high-velocity impact (unsafe impact velocity). For this reason, in some embodiments, the parachute system includes (e.g., three independent) ballistic parachutes where the rockets help to inflate their respective canopy quickly (e.g., one or more rockets per canopy, pulling upwards and outwards). In various embodiments, the individual parachutes include a variety of features, techniques, and/or technologies to inflate the canopies quickly and/or minimize any drop before the canopies fully inflate.

Figure 4:
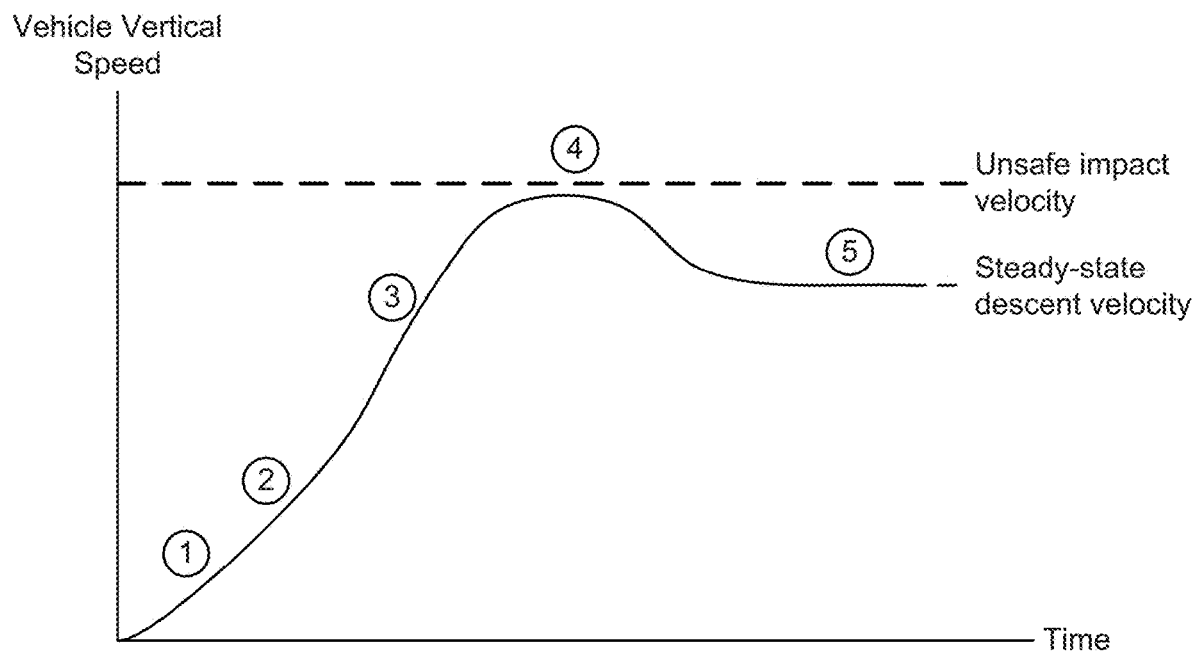
FIG. 4 shows vertical speed of a vehicle over time obtained in some embodiments of the present disclosure.
Figure 5:
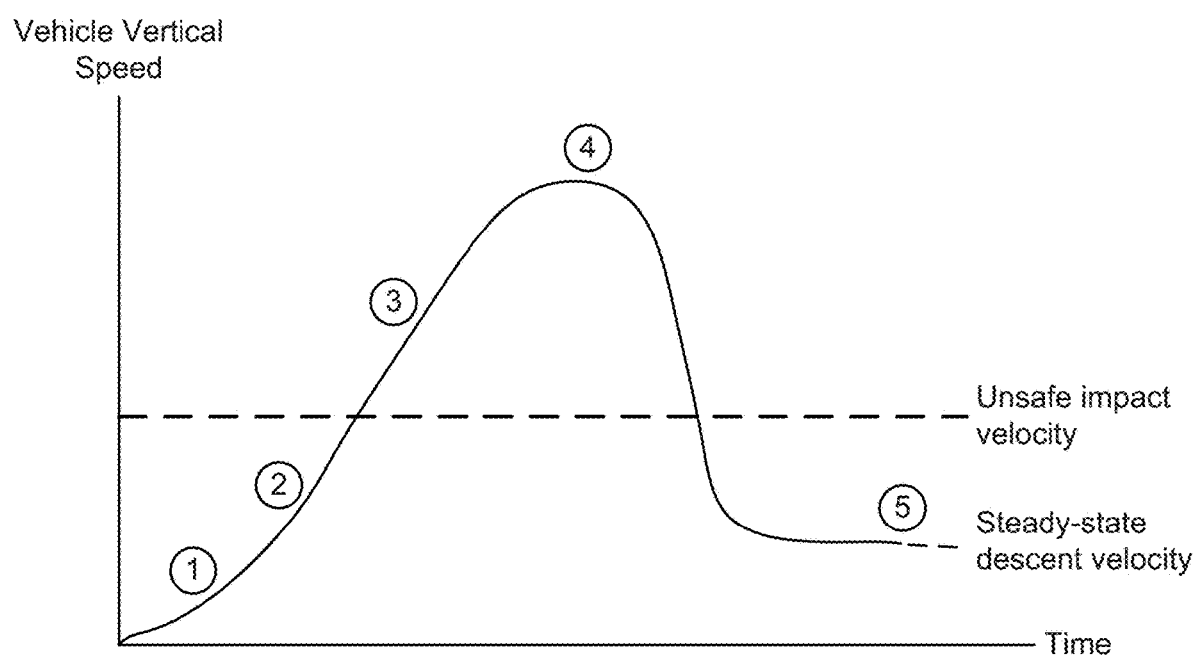
FIG. 5 shows vertical speed of a vehicle over time obtained in a typical system.

The parachute system with ballistic parachutes (also sometimes called low-altitude ballistic recovery system) disclosed here limits maximum downward speed during extraction and inflation (from hover) such that the impact is considered safe when the parachute is deployed from any altitude. That is, downward vehicle speed does not exceed an unsafe impact velocity. The unsafe impact velocity is a value considered unsafe. For example, at or exceeding an unsafe impact velocity, if the vehicle strikes an object or the ground, the vehicle occupants might be injured or killed. FIG. 4 shows vertical speed of a vehicle over time obtained in some embodiments of the present disclosure. FIG. 5 shows vertical speed of a vehicle over time obtained in a typical system. Each of the numbered circles corresponds to one of the states below:

1) Vehicle accelerates in freefall
2) A fault is detected and rocket(s) extract canop(y/ies) to begin slowing the vehicle
3) Vehicle begins to decelerate because canop(y/ies) begin to inflate
4) Canop(y/ies) are fully open to limit the maximum speed of the vehicle, and vehicle continues to decelerate
5) Vehicle reaches steady-state descent velocity under inflated canop(y/ies)

In embodiments of the low-altitude parachute system disclosed here, the vehicle vertical speed never exceeds an unsafe impact velocity as shown in FIG. 4. By contrast, a conventional system such as the one shown in FIG. 5 permits the vehicle vertical speed to exceed an unsafe impact velocity. This is because a conventional system is typically optimized for higher speeds. When the conventional system is used in a low-altitude and/or low-speed condition, the system is slow to inflate the canop(y/ies) so that vehicles can exceed an unsafe impact velocity before the canop(y/ies) are fully inflated to slow the fall of the vehicle.

Another desired characteristic of a parachute system for the exemplary aircraft shown here is that the canopies are able to properly and/or quickly inflate in a variety of (e.g., crosswind, cross flow, or airspeed) conditions. As shown in this example flight, the exemplary multicopter has at least two different flying modes: a hovering mode and a forward flight mode (e.g., between 302 and 304). The vertical takeoff (e.g., between 300 and 302) and vertical landing (e.g., between 304 and 306), for the purposes of explaining the parachute system embodiments described herein, fall under hovering mode. When the multicopter is in hovering mode, there is no front-to-back or side-to-side movement within the 2D plane defined by the longitudinal axis and the transverse axis. As such, there is very little crosswind due to the aircraft's movement in that 2D plane. This is one condition or situation in which the parachute system may be deployed.

In contrast, when the multicopter is in forward flight mode, there will be a relative airspeed due to the multicopter's movement (e.g., forwards in the example of FIG. 3). This is another condition or situation in which the parachute system may be deployed. In other words, it would be desirable if a parachute system used in the exemplary aircraft could deploy under both of these conditions.

Figure 6:
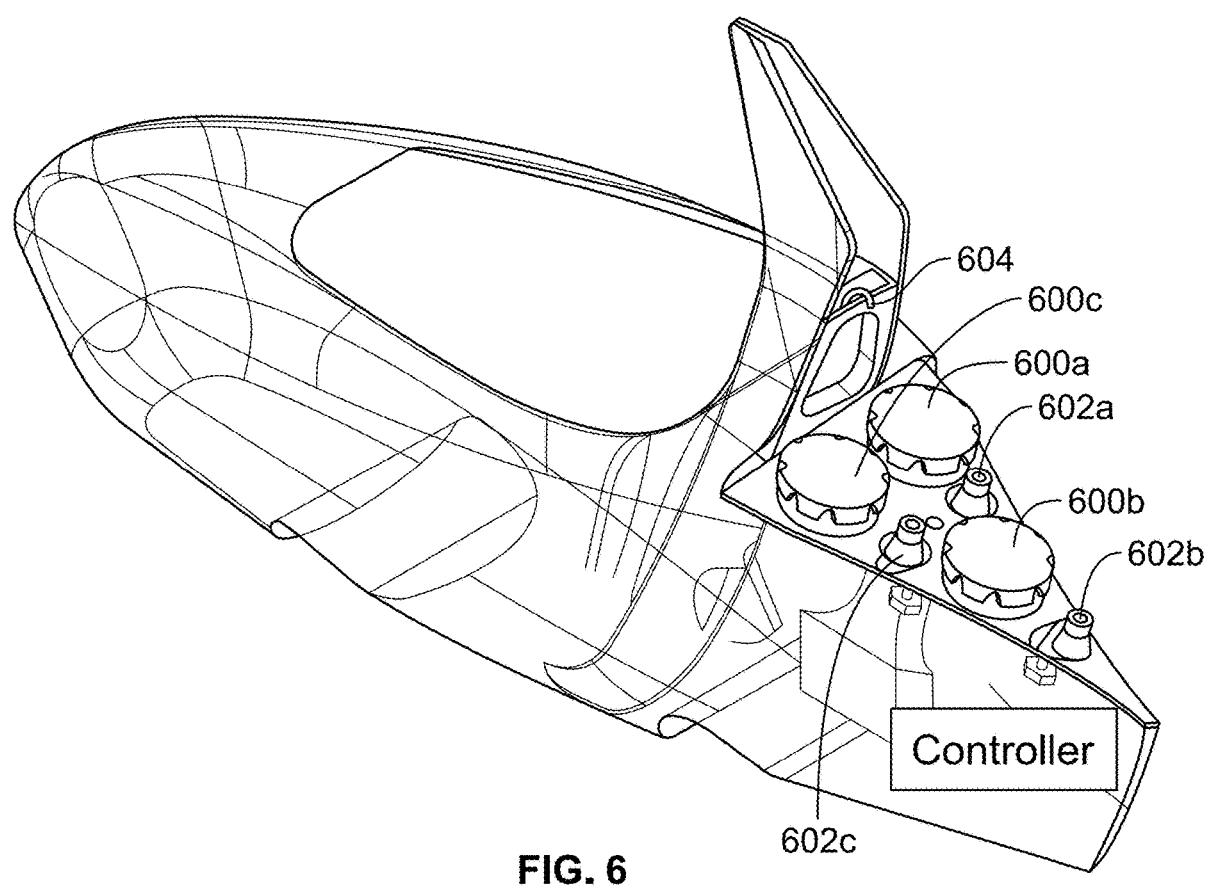
FIG. 6 is a diagram illustrating an embodiment of a 3-parachute system embedded behind the cockpit of a multicopter.

FIG. 6 is a diagram illustrating an embodiment of a 3-parachute system embedded behind the cockpit of a multicopter. The rotors (202), booms (204), and floats (206) shown in FIG. 2 are not relevant to this discussion and as such are not shown in this figure. In this example, there are three parachute canisters (600a-600c), each with its own packed canopy. Each of the canopies is extracted by its corresponding rocket motor (602a-602c). A controller is communicatively coupled to the rockets and/or parachutes to decide when and/or how to deploy the parachutes. The controller can perform a process such as the one shown in FIG. 1 to deploy the parachutes. As described above, the exemplary aircraft flies relatively close to the ground and using ballistic parachutes helps to minimize canopy inflation time and/or vertical drop before the parachute system slows the descent of the aircraft.

In this example, the parachute canisters (600a-600c) are arranged in a cluster (e.g., instead of a single parachute) which helps with inflation time while still slowing the descent of the aircraft. For example, suppose a single, large canopy with the same effective diameter as the three smaller canopies was used instead. The larger canopy would require more time to inflate while still offering roughly the same deceleration performance as the three smaller canopies combined. Furthermore, with multiple canopies, this eliminates a single point of failure (e.g., if one of the canopies fails to open, the other two canopies will probably open) whereas if the single, large canopy fails to open, there is no backup parachute. Naturally, the diameter of the canopies may be selected so that even if one of the canopies fails to open, the descent will still be survivable. A more detailed example of a parachute canister (600a-600c) is described below.

In various embodiments, the propellant in the rocket motors (602a-602c) is ignited using power cartridges, pyrotechnic assemblies, igniters, or initiators. These methods of ignition may be desirable because there is a relatively short lag from flight computer initiation signal to igniter and rocket ignition, both of which (further) help to minimize canopy inflation time and/or vertical drop.

Each of the canopies in the parachute canisters (600a-600c) is connected by a separate (e.g., independent) line (not shown) to a connection point (604) behind the pilot's headrest. These separate lines help to prevent single points of failure. The connection point is part of the frame of the fuselage (e.g., which also includes the pilot's seat) to help ensure that the pilot and the fuselage stay with the parachute.

As described above, the parachute system may be deployed when the aircraft is hovering or when the aircraft is flying forwards above a certain airspeed. In some embodiments, to better handle the different conditions, two different deployment processes and/or techniques are used in these modes. FIG. 1 describes an example of this.

Figure 9A:
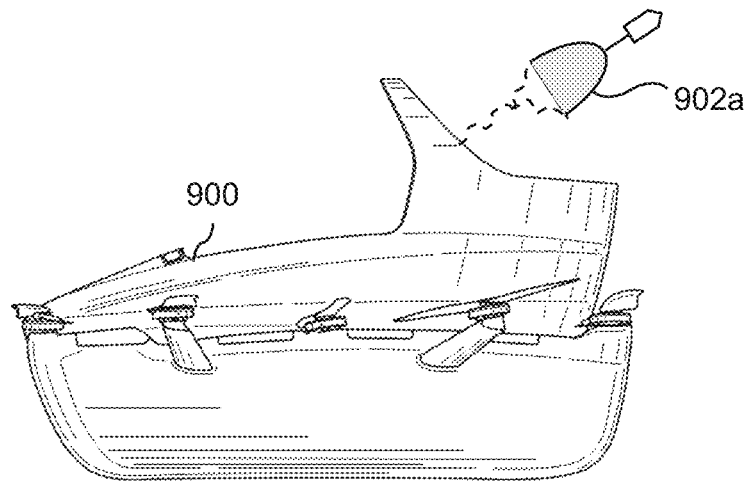
FIG. 9A shows the system when a drogue begins to deploy.
Figure 9B:
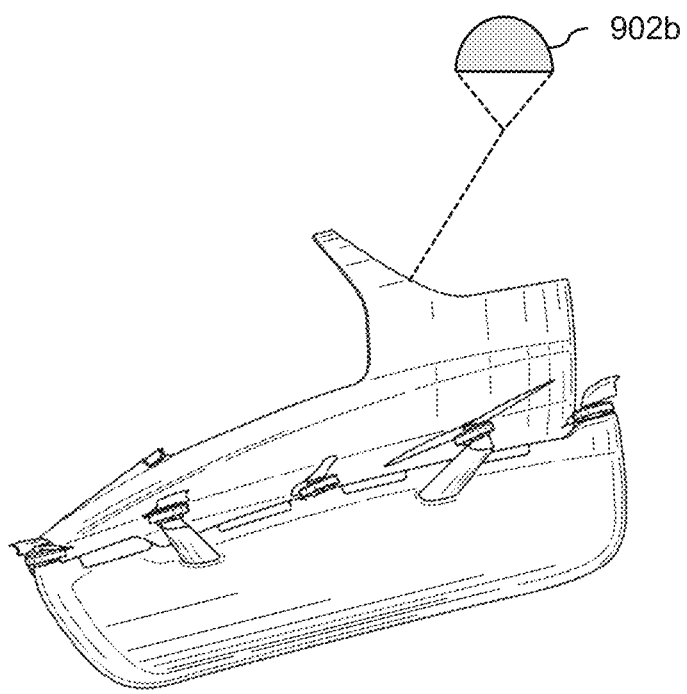
FIG. 9B shows the system when the drogue is fully deployed.
Figure 9C:
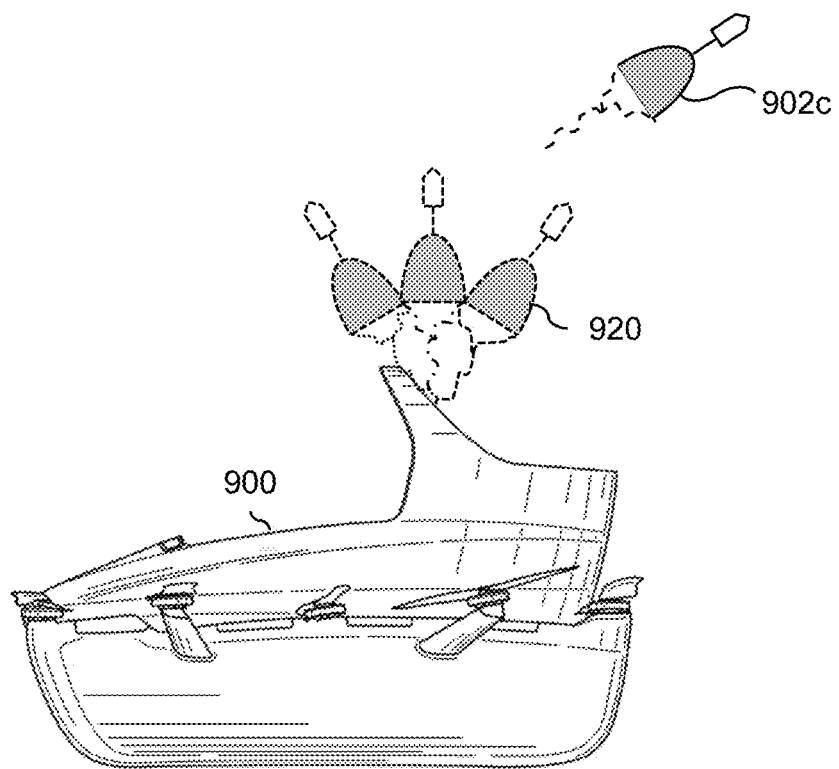
FIG. 9C shows the system when the drogue separates from the rest of the system and additional parachutes begin deploying.

In some embodiments, a drogue parachute is deployed prior to the deployment sequence shown in FIG. 8A and FIG. 8B. FIG. 9A to FIG. 9C show an example of a drogue parachute deployment. FIG. 9A shows the system when a drogue begins to deploy. FIG. 9B shows the system when the drogue is fully deployed. FIG. 9C shows the system when the drogue separates from the rest of the system and additional parachutes begin deploying.

The drogue parachute 902a is separate from the main canop(y/ies) and is configured to operate above certain airspeeds and altitudes to slow and stabilize the vehicle, limiting high-speed opening shock, and increasing the probability of successful deployment of the main canop(y/ies). Sometimes, after a first main canopy deploys, the vehicle may be so unstable (the limits of oscillation of the vehicle in steady state are such) that deploying subsequent main canopies would interfere or hit the first main canopy. This may cause the main canopies to not be able to operate sufficiently to slow the vehicle to a safe state. A drogue parachute puts the vehicle into a state optimal for the three main parachutes to be deployed.

In various embodiments, a drogue parachute is deployed when the vehicle is above a certain airspeed and/or certain altitude. In one aspect, being above the threshold airspeed and/or altitude provides additional time and distance to allow proper sequencing of the drogue and main parachutes. In another aspect, being above the threshold airspeed and/or altitude may make it more challenging for the main parachutes (alone, without the drogue) to achieve sufficient stability and deceleration of the vehicle. Thus, above the certain airspeed and/or altitude, a drogue parachute is deployed first. A flight computer may determine whether the vehicle is in a suitable state (e.g., based on altitude, airspeed, and/or other vehicle state information) for deploying the drogue or if instead the main canop(y/ies) are to be deployed without first deploying the drogue. In some embodiments, vehicles operate above a certain airspeed only above a specified altitude. For example, the flight profile of a vehicle may require the vehicle to operate above a certain airspeed only above a specified altitude. In some embodiments, when a vehicle is traveling at above 25 mph and on the order of hundreds of feet (e.g., 100-300 feet), then a drogue is deployed first.

In an embodiment, a drogue is deployed, the vehicle slows (e.g., after a waiting period), and then one or more main canop(y/ies) are deployed. Referring to FIG. 9A, drogue 902a is deployed. The drogue may be attached to the vehicle 900 at the same attachment point as the main canopies (see FIG. 7A for an example of where the main canopies are attached). The drogue 902b in FIG. 9B is fully deployed and the canopy opened, bringing the vehicle to a stable state suitable for the main canop(y/ies) to be deployed. In some embodiments, sensors may report back to a flight computer the vehicle's airspeed and when the speed meets/is below a threshold, then the flight computer triggers the deployment of one or more main canop(y/ies) as shown in FIG. 9C. In this example, all three main canopies 920 (corresponding to 702) are deployed at once and deployment proceeds according to FIGS. 7A and 7B or FIGS. 8A and 8B. In other embodiments, canopies may be deployed one (or a few) at a time. The drogue may be extracted using a rocket, mortar, pilot parachute, pressurized device, or other means of extraction. The drogue may be cut away from the vehicle prior to extraction of the main parachutes as shown. Alternatively, the drogue may remain connected to the vehicle. In some embodiments, a drogue parachute has a smaller surface area compared with a main parachute and permits more air to move through the canopy.

In some embodiments, canopy extraction may occur in sequence or in quick succession in order to reduce peak loading on the pilot due to canopies opening simultaneously at high speeds, but also occurring fast enough to ensure all canopies are fully extracted before any one is fully inflated in order to avoid striking canopy fabric with a rocket deployed later in sequence.

Figure 26:
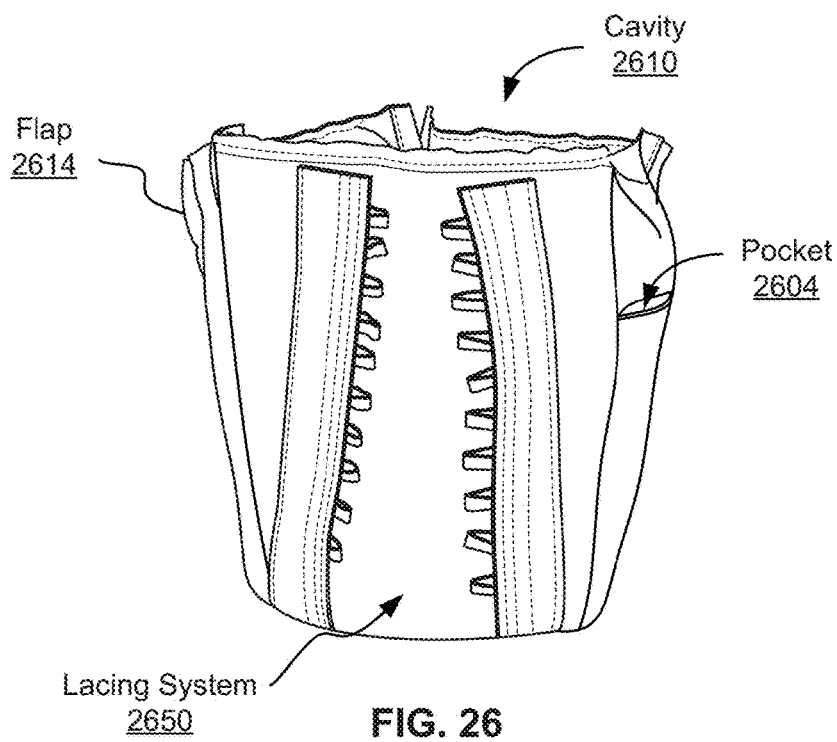
FIG. 26 is a diagram illustrating an embodiment of a soft pack container for a parachute.
Figure 27:
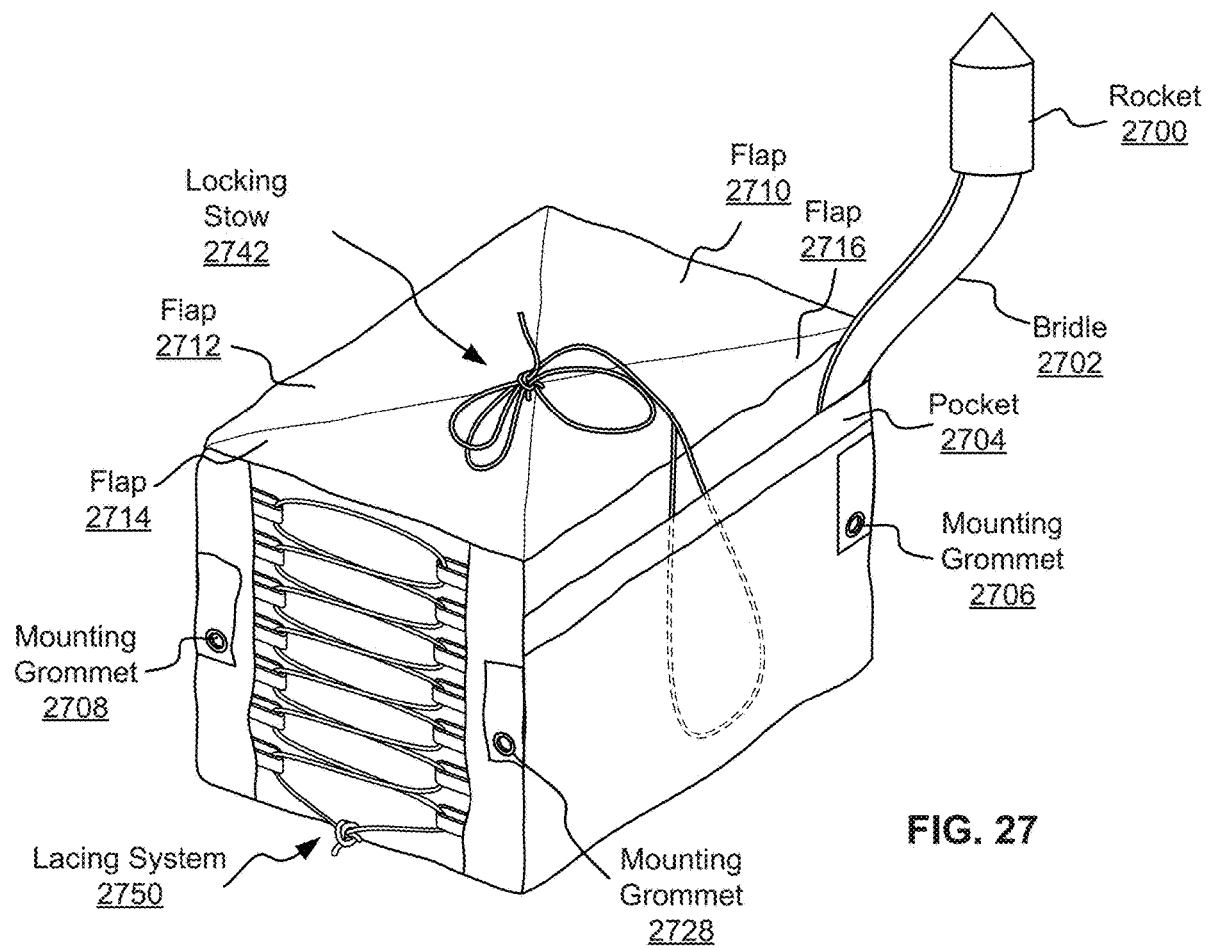
FIG. 27 is a diagram illustrating an embodiment of a soft pack container for a parachute in a packed state.

The following figures describe example canopies and lines which may be used to implement a (e.g., single) parachute canister such as 600a-600c in FIG. 6. First, canopies and lines will be described (FIGS. 10-21), then a canister will be described (FIGS. 26 and 27). The parachutes described below are merely exemplary and are not intended to be limiting. For example, other parachutes (e.g., comprising some other canopies and lines with some other arrangements and/or features) which can quickly inflate (e.g., for use at relatively low altitudes) may also be used.

A parachute tow and release system with canopy extraction controlled by a drag surface is disclosed. The techniques described here include parametrically tuning extension damping and air inflow to reduce recoil and decrease parachute inflation time. In some embodiments, a parachute deployment system includes a parachute coupled to a release via a first load path. The first load path includes parachute lines attached to a crown of the parachute. These parachute lines are called upper parachute lines or crown lines. The system includes a release adapted to attach the parachute to a rocket via the upper parachute lines, and disengage the parachute from the rocket if a load shifts from the first load path to a second load path. The system includes a line constrainer provided between the release and the parachute. The upper parachute lines pass through the line constrainer, and the line constrainer is adapted to restrict an extent to which the upper parachute lines are able to extend away from a longitudinal axis of the parachute.

Figure 19B:
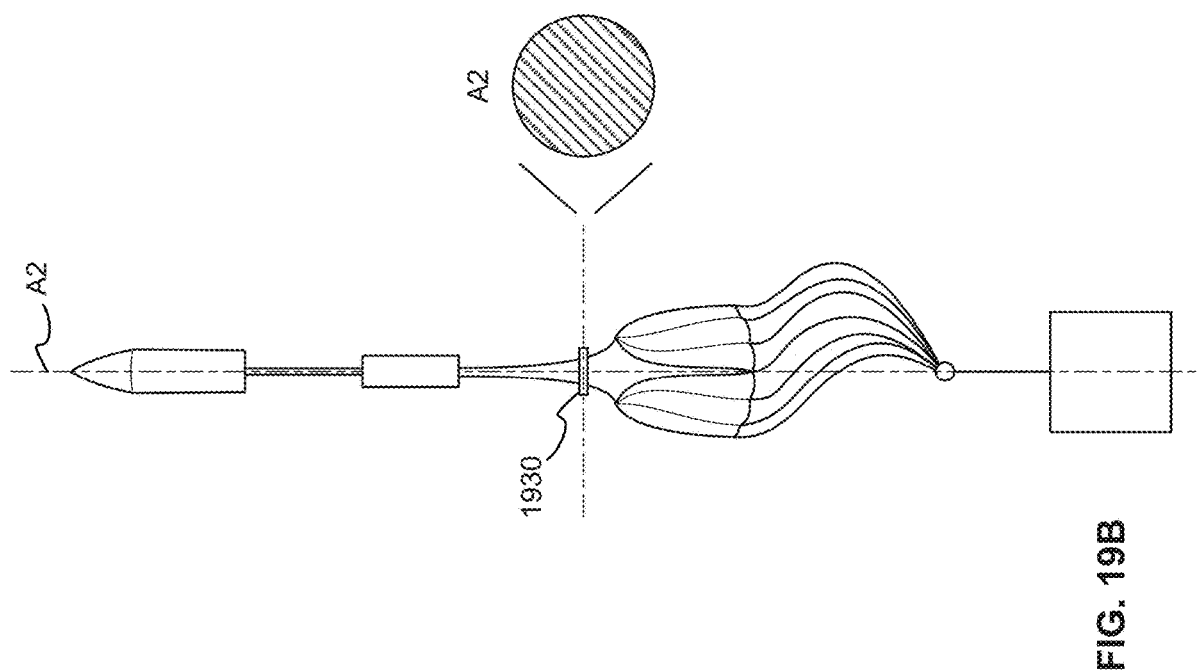
FIG. 19B is a diagram illustrating an embodiment of a parachute deployment system including a line constrainer associated with a second area, A2.
Figure 19A:
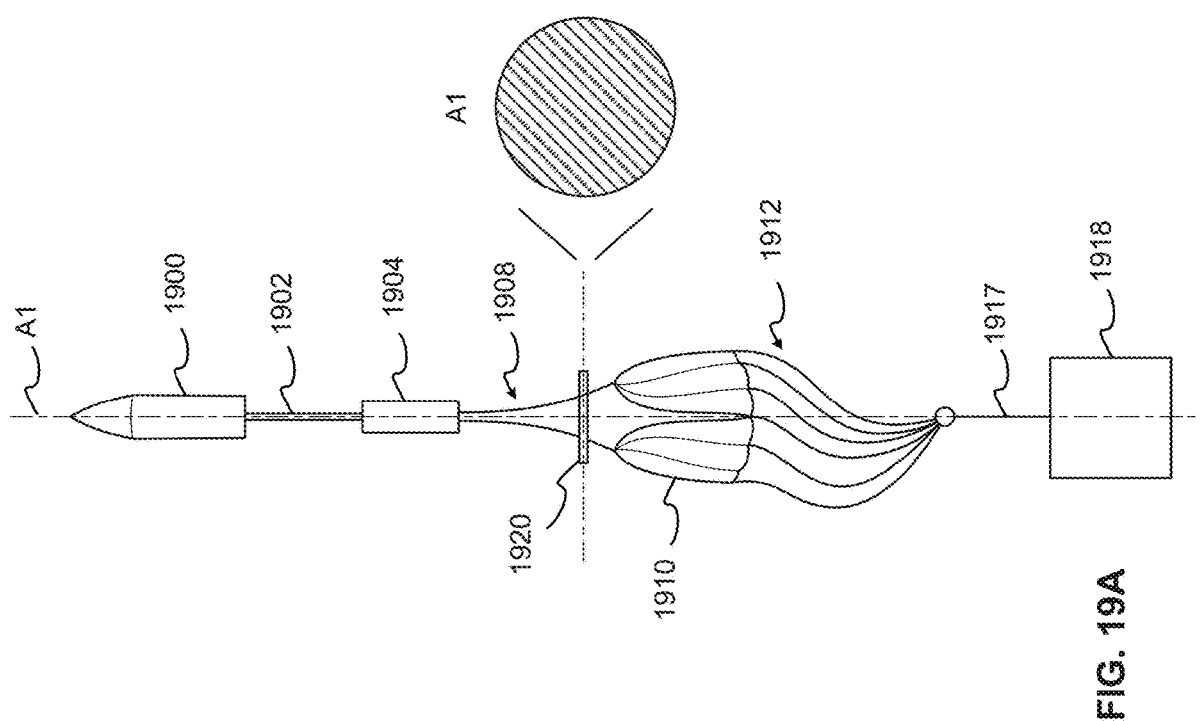
FIG. 19A is a diagram illustrating an embodiment of a parachute deployment system including a line constrainer associated with a first area, A1.

In various embodiments, the first load path further includes one or more lower parachute lines (also called suspension lines). The system includes a lower parachute line restrainer which, when released, permits the lower parachute line(s) to extend to full length. The full extension of the lower parachute line(s) causes the load to shift from the first load path to the second load path. The second load path includes a release line that becomes taut when the load shifts. Consequently, the parachute is disengaged from the rocket via the release, the release line and upper parachute lines separate from the release, and the rocket assembly propels itself away from the main parachute assembly. In some embodiments, the upper parachute lines function as tow lines. That is, the same set of lines are both upper parachute lines and tow lines. An example of a parachute deployment system in which the upper parachute lines and tow lines are the same is shown in FIGS. 19A and 19B. The second load path, in various embodiments, includes a release line.

First, some embodiments of a parachute system without a line constrainer (e.g., on or around the upper parachute lines) are described. This enables a simpler and/or clearer explanation of how the load shifting from a first load path to a second load path enables a rocket to be released or otherwise decoupled from the parachute (e.g., without the added complexity of having to discuss a line constrainer). Then, some embodiments of a parachute system with a line constrainer on the upper parachute lines are described. This enables the discussion of those later embodiments to focus more clearly and/or easily on those line constrainer embodiments and how they further improve the parachute system.

Quickly extracting the parachute using a rocket exerts a high load on at least one line (e.g., the rocket tow line and also the upper parachute lines or crown lines) connecting the rocket and the parachute. The rocket is released or otherwise disconnected from the parachute following parachute extraction for various reasons. For example, if the rocket remains attached, it may present a fire hazard to the parachute, add undesirable weight to the parachute and payload, and/or cause the parachute to move in an undesirable and/or unpredictable manner. The additional line length may constrict the fabric of the canopy and may prevent the parachute from opening freely. The manner in which the rocket is released or otherwise disconnected from the parachute must be carefully considered. For example, severing (e.g., directly cutting) the line that connects the rocket and the parachute while the line is under high load (e.g., because the rocket is pulling the line taut) causes the line and/or parachute to recoil. Recoil of the parachute may result in unpredictable inflation, line tangling, and/or altitude loss, and is therefore undesirable.

The amount of recoil can be tuned according to the techniques described here. Recoil can be controlled by adjusting, for example, the amount of damping or drag induced by a surface moving through the air as the parachute is extracted or extended. A high level of damping corresponds to less recoil. A low level of damping corresponds to more recoil. As more fully described below, extension damping is tuned by controlling the extent to which upper parachute lines are permitted to extend away from a longitudinal axis of the parachute. Tunable extension damping finds application in a variety of flying conditions. For example, when an aircraft is intended to fly relatively close to the ground, recoil is undesirable because the more recoil there is, the more likely that the aircraft will lose altitude and hit the ground. Thus, for low-flying aircraft, the extension damping of the parachute can be tuned to have a high level of damping. Conversely, for relatively high flying aircraft, there is greater tolerance for altitude loss/recoil, and the extension damping can be tuned to have a relatively low level of damping.

In some embodiments, a parachute deployment system comprises a tow line, a set of upper parachute lines (crown lines), a (e.g., separate) release line, and a line constrainer. The line constrainer is adapted to restrict an extent to which the upper parachute lines are able to extend away from a longitudinal axis of the parachute. In some embodiments, restricting the extension of the upper parachute lines allows extension damping to be tuned to reduce recoil. In some embodiments, both the tow and release lines are attached to a release which connects the rocket and the parachute and (e.g., at the appropriate time or condition) disconnects the rocket and the parachute from each other. In some embodiments, having a separate tow line and release line allows the parachute to be extracted quickly (e.g., using the tow line where the tow line is taut and the release line is slack) and the rocket to be released smoothly (e.g., when the release line becomes taut). In the disclosed system, the tow line first takes the load of the payload. That is to say, the tow line is part of a load path that connects the rocket to the payload. The load path may comprise the tow line, upper lines of the parachute or crown lines, suspension lines of the parachute, and a riser of the parachute. In some embodiments, various parts of the parachute (e.g., the lines, the riser, etc.) are constructed of nylon because nylon is better for shock absorption. In some embodiments, the release line is situated (e.g., runs) parallel to the tow line but is slack and bears no load (at least initially). A lower parachute line restrainer (at least in some embodiments) is configured to release under a threshold force and may release after a canopy of the parachute is fully extracted. In some embodiments, release of the lower parachute line restrainer causes the load to shift from the tow line to the release line. For example, the release line begins to be pulled taut. In some embodiments, the load is shifted by changing relative lengths of the lines. Due to the load on the release line, the release opens. In some embodiments, the release opens under a small load. The opening of the release causes the rocket and the parachute to detach.

Figure 10:
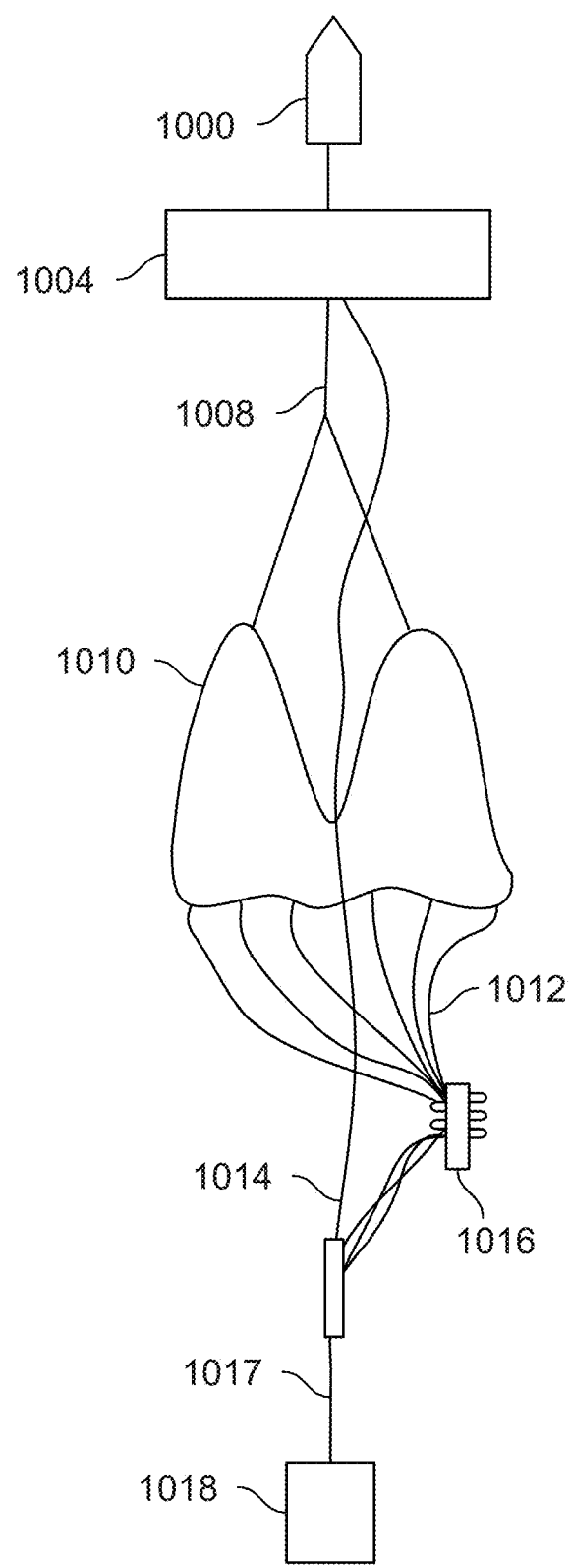
FIG. 10 is a diagram illustrating an embodiment of a parachute deployment system.

FIG. 10 is a diagram illustrating an embodiment of a parachute deployment system. In the example shown, rocket 1000 is tethered to release 1004. In some embodiments, rocket 1000 is permanently attached or connected to release 1004. For example, release 1004 is designed to remain with rocket 1000 following separation of rocket 1000 and canopy 1010. In various embodiments, release 1004 comprises a latch, a cutter, a pin, or any other appropriate release. As will be described in more detail below, the release is designed to disconnect the rocket from the rest of the aircraft (including the parachute) with minimal recoil.

Tow line 1008 is attached to release 1004 at its upper end. At its lower end, tow line 1008 is attached to canopy 1010 via the upper parachute lines. Upper parachute lines are attached to the canopy in the middle of the canopy, between an apex and outer edge of the canopy. In some embodiments, attaching the upper parachute lines to the middle of the canopy or lower on the canopy than its apex allows lower sections of the canopy to be pulled out quickly, which helps when the aircraft is at a low altitude, and provides even distribution of tension across all lower parachute lines. In various embodiments, tow line 1008 is attached to canopy 1010 using 4, 70, 20, or any appropriate number of upper parachute lines. The upper parachute lines are positioned equidistant around the canopy. In some embodiments, the canopy is packed and initially extracted in an "M" cross-sectional shape which inflates more quickly than a typical cylindrical shape. For example, the apex of the canopy is packed in an inverted position.

Suspension lines 1012 extend from canopy 1010. In various embodiments, various numbers of suspension lines are used. A portion of the suspension lines is folded up and held in lower parachute line restrainer 1016. In various embodiments, lower parachute line restrainer 1016 comprises a bight, a tied or sewed cloth, a thin plastic tube, a cardboard loop, or any appropriate restrainer that holds the suspension lines such that their lengths are effectively shortened. The lower parachute line restrainer is configured to release under a threshold force (e.g., due to the rocket). For example, the lower parachute line restrainer is configured to break, rip, tear, or open under the threshold force. The suspension lines 1012 and release line 1014 are attached at their bottom ends to riser 1017. In various embodiments, riser 1017 comprises one line, multiple lines, or webbing. Riser 1017 is attached to payload 1018. In some embodiments, payload 1018 comprises an aircraft.

In some embodiments, the release line is tied directly from the release to the bottom of the suspension lines. In some embodiments, the release line is tied to the apex, which in turn is tied to the center line. The center line extends from an apex of the canopy to a confluence point at the bottom of the suspension lines. In some embodiments, the release line is tied directly to the center line.

The following figures show examples of the exemplary parachute deployment system at various points in time in order to better illustrate how the parachute deployment system works and how it is able to disconnect the rocket with little or no recoil.

Figure 11A:
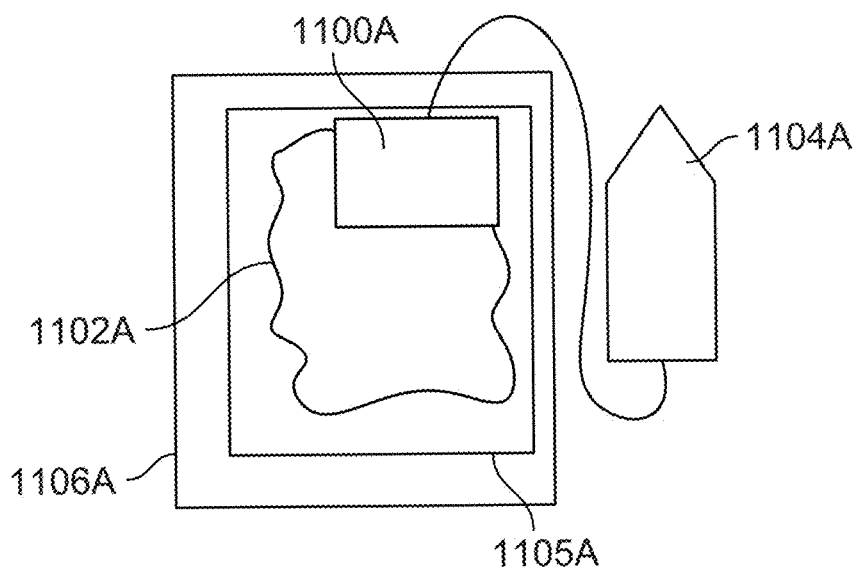
FIG. 11A is a diagram illustrating an embodiment of a parachute deployment system in a stowed state.

FIG. 11A is a diagram illustrating an embodiment of a parachute deployment system in a stowed state. In the example shown, a parachute is stowed inside can 1105A. Canopy 1102A is folded and stored in the can along with release 1100A. The can is stored on or in payload 1106A, which may comprise a cavity or compartment in an aircraft where the parachute deployment system is stored. Rocket 1104A is positioned externally to the can.

Figure 11B:
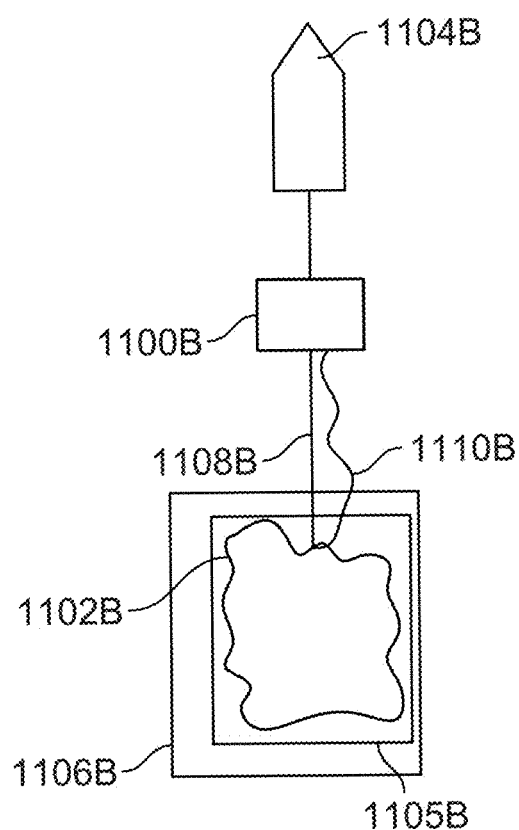
FIG. 11B is a diagram illustrating an embodiment of a parachute deployment system following rocket deployment.

FIG. 11B is a diagram illustrating an embodiment of a parachute deployment system following rocket deployment. Upon triggering the parachute deployment system, rocket 1104B begins traveling upwards away from payload 1106B. The rocket is attached to and tows release 1100B. Release 1100B in turn is attached to the parachute via tow line 1108B and release line 1110B. Canopy 1102B remains folded inside of can 1105B. It is noted that in the state shown here, the tow line 1108B is taut and the release line 1110B is slack.

Figure 11D:
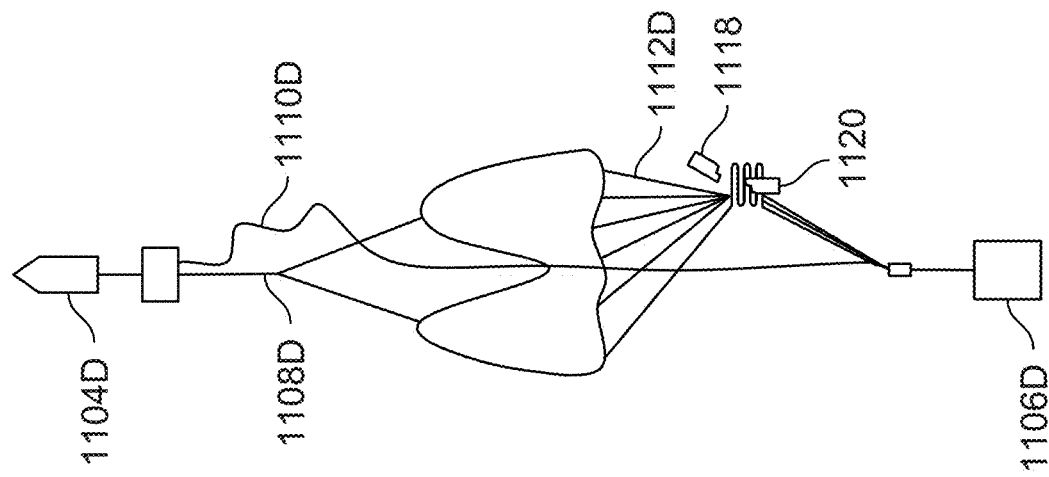
FIG. 11D is a diagram illustrating an embodiment of a parachute deployment system during release of a lower parachute line, canopy line, and/or suspension line restrainer.
Figure 11C:
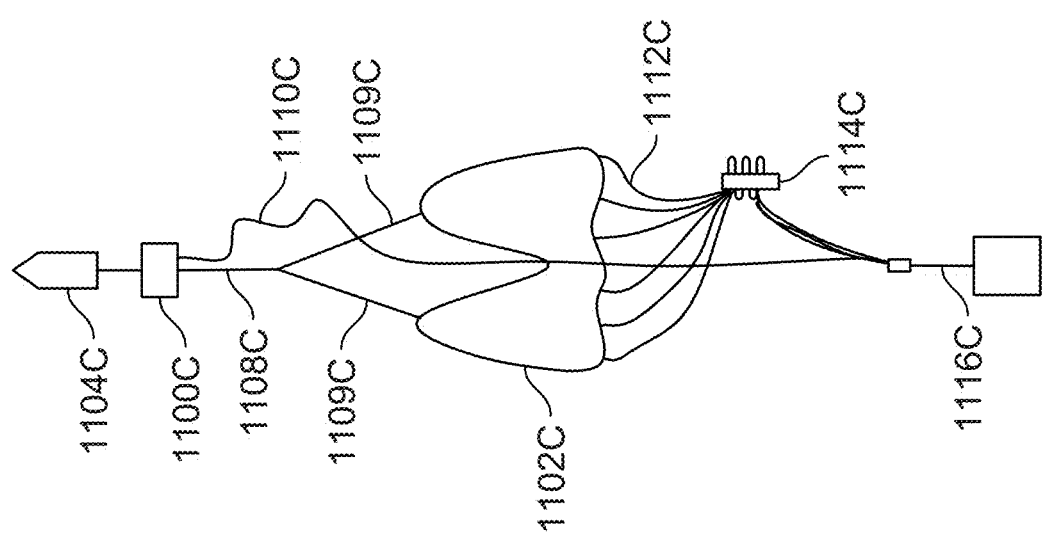
FIG. 11C is a diagram illustrating an embodiment of a parachute deployment system wherein the parachute is towed via a tow line.

FIG. 11C is a diagram illustrating an embodiment of a parachute deployment system wherein the parachute is towed via a tow line. In the example shown, canopy 1102C has been extracted and is no longer in the can (not shown). Rocket 1104C tows release 1100C. Release 1100C is attached to canopy 1102C via tow line 1108C and upper parachute lines 1109C which are sometimes referred to as crown lines. Suspension lines 1112C extend from canopy 1102C and a portion of the lines is held in lower parachute line restrainer 1114C, shortening the effective lengths of the lines. Release line 1110C extends from release 1100C. Suspension lines 1112C and release line 1110C are attached to riser 1116C.

As shown, rocket 1104C is towing canopy 1102C upwards via tow line 1108C and therefore tow line 1108C is taut. Release line 1110C is slack in the state shown. In some embodiments, the length of release line 1110C is longer than the combined length of the tow line, canopy length between the tow line and suspension lines, and suspension lines held in lower parachute line restrainer 1114C. In this initial extraction state, neither the tow line nor the release line are under load. As the rocket travels further from the payload, the combined length of tow line 1108C, suspension lines 1112C, and riser 1116C are pulled taut. Once that occurs, the portion of the canopy between the tow line and suspension lines is also pulled taut. At this point, the parachute is fully extracted from the can. The rocket pulls upwards on the combined length while the payload exerts a downwards force on the combined length due to inertia. The tow line is under load, whereas the release line remains slack and is not under load. The load path from the rocket to the payload travels through the tow line, suspension lines held in the restrainer, and riser rather than traveling through the release line and riser because the release line is longer in length than the combined length of the tow line, suspension lines held in the restrainer, and intermediaries such as the portion of the canopy between the tow line and suspension lines or lines used to attach the tow line to the canopy.

FIG. 11D is a diagram illustrating an embodiment of a parachute deployment system during release of a lower parachute line, canopy line, and/or suspension line restrainer. For simplicity, a lower parachute line restrainer is described in this example, but in other embodiments a restrainer is associated with a canopy line and/or suspension line (e.g., in addition to or as an alternative to a lower parachute line). In this example, the lower parachute line restrainer is configured to release under a first threshold force. In some embodiments, the lower parachute line restrainer is configured to release after the parachute is fully extracted from the can. For example, the first threshold force is equal to a force the lower parachute restrainer experiences in the event the suspension lines are pulled taut. In some embodiments, the first threshold force is equal to a force that the lower parachute line restrainer experiences in the event of sustained load on the suspension lines. For example, the lower parachute line restrainer will not break immediately in the event the suspension lines are pulled taut, but a short time after due to the forces exerted by the rocket and payload. In some embodiments, the first threshold force is determined based on experimental data. The type of lower parachute line restrainer may be chosen based on the first threshold force. The lower parachute line restrainer may be calibrated based on the first threshold force. For clarity, suspension lines 1112D and lower parachute line restrainer pieces 1118 and 1120 are shown pulled to the side so that they are not obscured by release line 1110D. In actuality, the suspension lines 1112D may be pulled straight (e.g., between the rocket and payload) when the lower parachute line restrainer breaks or otherwise releases.

In the example shown, lower parachute line restrainer pieces 1118 and 1120 have broken off of suspension lines 12D. The suspension lines as shown have been released from their taut, shortened position. Tow line 1108D is taut. Release line 1110D is slack. As rocket 1104D continues traveling upwards away from payload 1106D, both tow and release lines may first be slack because both are too long to restrain the rocket initially. As the rocket continues traveling or the payload continues falling, load will eventually transition to release line 1110D due to its shorter length compared to the longer combined length of the tow line, canopy portion, and suspension lines (no longer shortened by the lower parachute line restrainer).

Figure 11F:
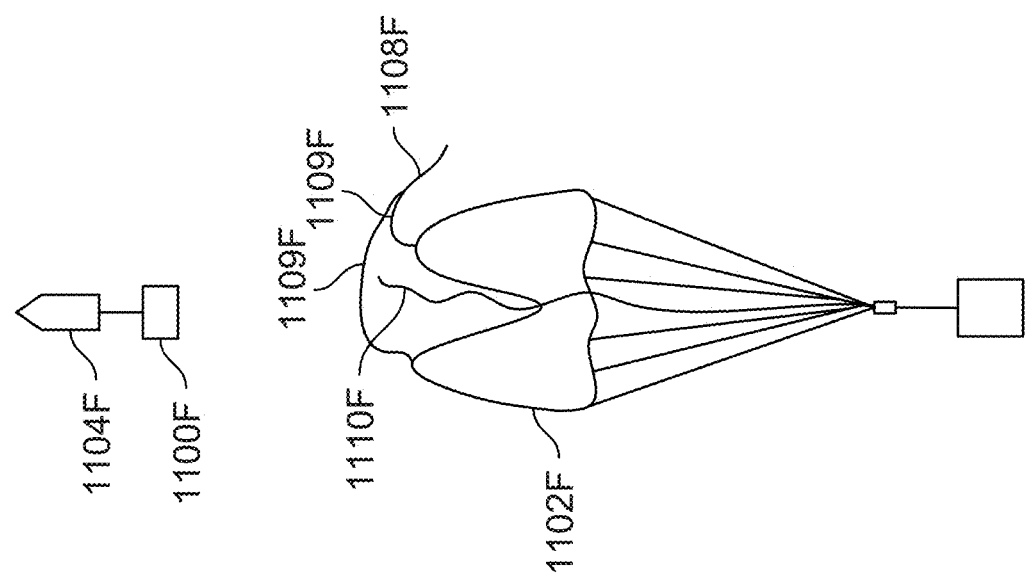
FIG. 11F is a diagram illustrating an embodiment of a parachute deployment system wherein the parachute is separated from a rocket.
Figure 11E:
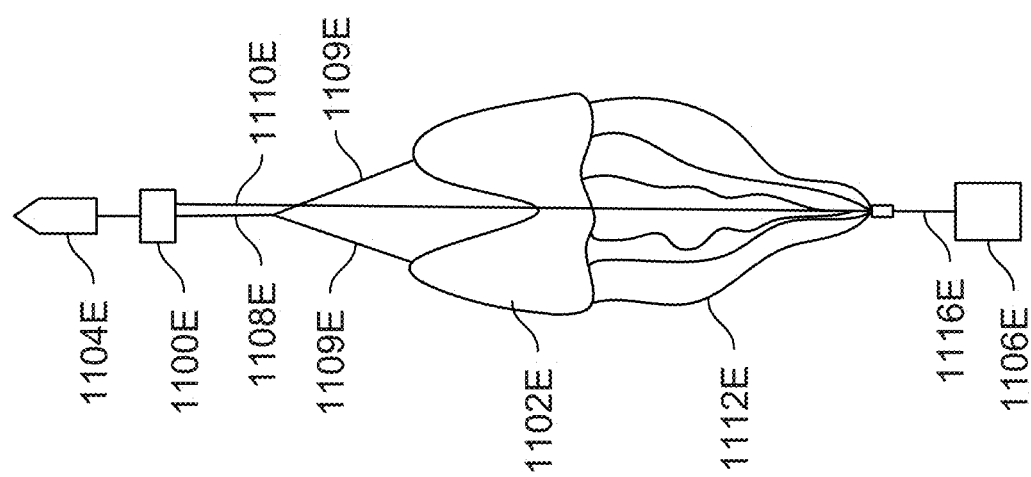
FIG. 11E is a diagram illustrating an embodiment of a parachute deployment system wherein the tow load imparted by the rocket is transferred to a release line.

FIG. 11E is a diagram illustrating an embodiment of a parachute deployment system wherein the tow load imparted by the rocket is transferred to a release line. It is noted that the parachute isn't actually towed at this point. In the example shown, suspension lines 1112E are at their full, unrestrained length. The suspension lines 1112E are slack because the load has shifted to release line 1110E such that release line 1110E is taut. The load path from rocket 1104E to payload 1106E now comprises release line 1110E and riser 1116E. In some embodiments, the release line is attached to the center line and then to the riser. The release line is shorter in length than the combined length of the length of tow line 1108E, the upper parachute or crown lines (1109E), the length of the portion of canopy 1102E that is in between the tow line and the suspension lines, and the length of one suspension line.

The release line is configured to open release 1100E under a second threshold force. Some examples of the release are described in more detail below. In some embodiments, the second threshold force is a low force. The second threshold force may be lower than the first threshold force required to release the lower parachute line restrainer. A desired level of force for the second threshold force may be determined experimentally. In the event the release line is under the second threshold force, release 1100E opens. In some embodiments, the opening of release 1100E allows the parachute and rocket to separate with little or no recoil.

FIG. 11F is a diagram illustrating an embodiment of a parachute deployment system wherein the parachute is separated from a rocket. In the example shown, rocket 1104F remains tethered to release 1100F. The rocket and release are separated from the parachute and payload. Release line 1110F and tow line 1108F and upper parachute lines 1109F dangle from canopy 1102F. In some embodiments, canopy 1102F completely fills following detachment of the rocket.

In some embodiments, a parachute deployment system includes other components and/or is configured in some other manner not shown here. The following figure describes one such alternate.

Figure 12:
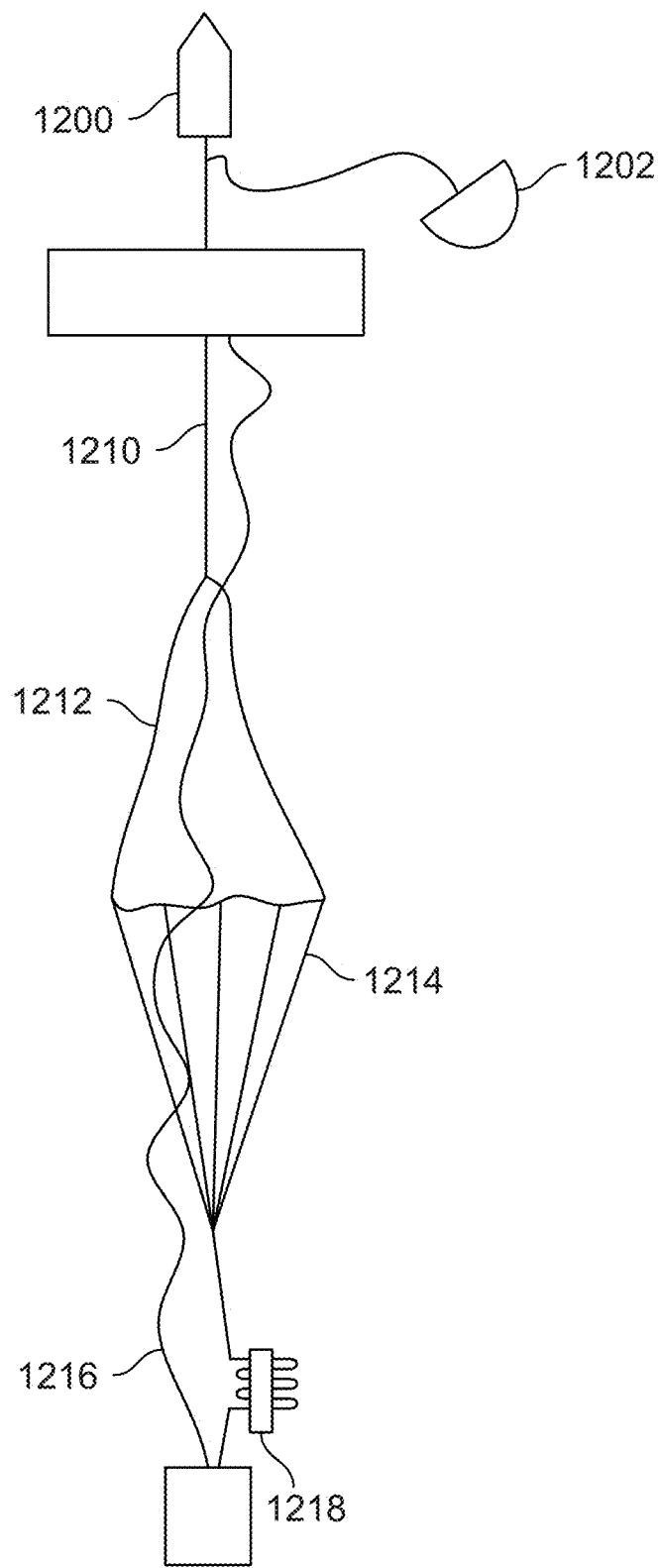
FIG. 12 is a diagram illustrating an embodiment of a parachute deployment system.

FIG. 12 is a diagram illustrating an embodiment of a parachute deployment system. In this example, the rocket 1200 has an attached parachute 1202 that allows the rocket to float to the ground. The parachute may be installed for safety to prevent the rocket from impacting a person or object at a high speed and causing damage.

In various embodiments, the parachute is towed from different points on its canopy and this figure shows an example different from that shown in the previous figures. In this example, tow line 1210 is attached at the apex of canopy 1212. Canopy 1212 is extracted in a roughly triangular cross-section shape.

In various embodiments, the lower end of the release line is attached at different points. For example, the release line as shown is attached to the payload directly. In some embodiments, the release line is attached to a riser of the parachute.

In some embodiments, the lower parachute line restrainer restrains a riser of the parachute rather than suspension lines. In the example shown, lower parachute line restrainer 1218 holds a riser of the parachute in a position such that its effective length is shortened. For example, loops of the riser are folded back and forth and secured. Release line 1216 is longer than a combined length of the length of tow line 1210, a length from apex to opening of canopy 1212, a length of one suspension line of suspension lines 1214, and the riser as restrained by lower parachute line restrainer 1218. In the event lower parachute line restrainer 1218 is released, the release line is shorter than the prior described combined length.

In some embodiments, the relative lengths concept remains the same regardless of positioning of the release line, tow line, and lower parachute line restrainer. For example, a first load path which includes the tow line is initially longer than a second load path which includes the release line. Following release of the lower parachute line restrainer, the first load path is shorter than the second load path, which eventually causes the load path to change.

In some embodiments, the parachute deployment system includes a rip stitch (not shown here). A rip stitch is a fabric piece that is designed to rip in order to absorb shock when the parachute deploys, reducing line loading and thus reducing recoil. In some embodiments, a rip stitch is placed at the very bottom of the riser and/or at the bottom of the suspension lines.

The following figure describes the examples above more generally and/or formally in a flowchart.

Figure 13:
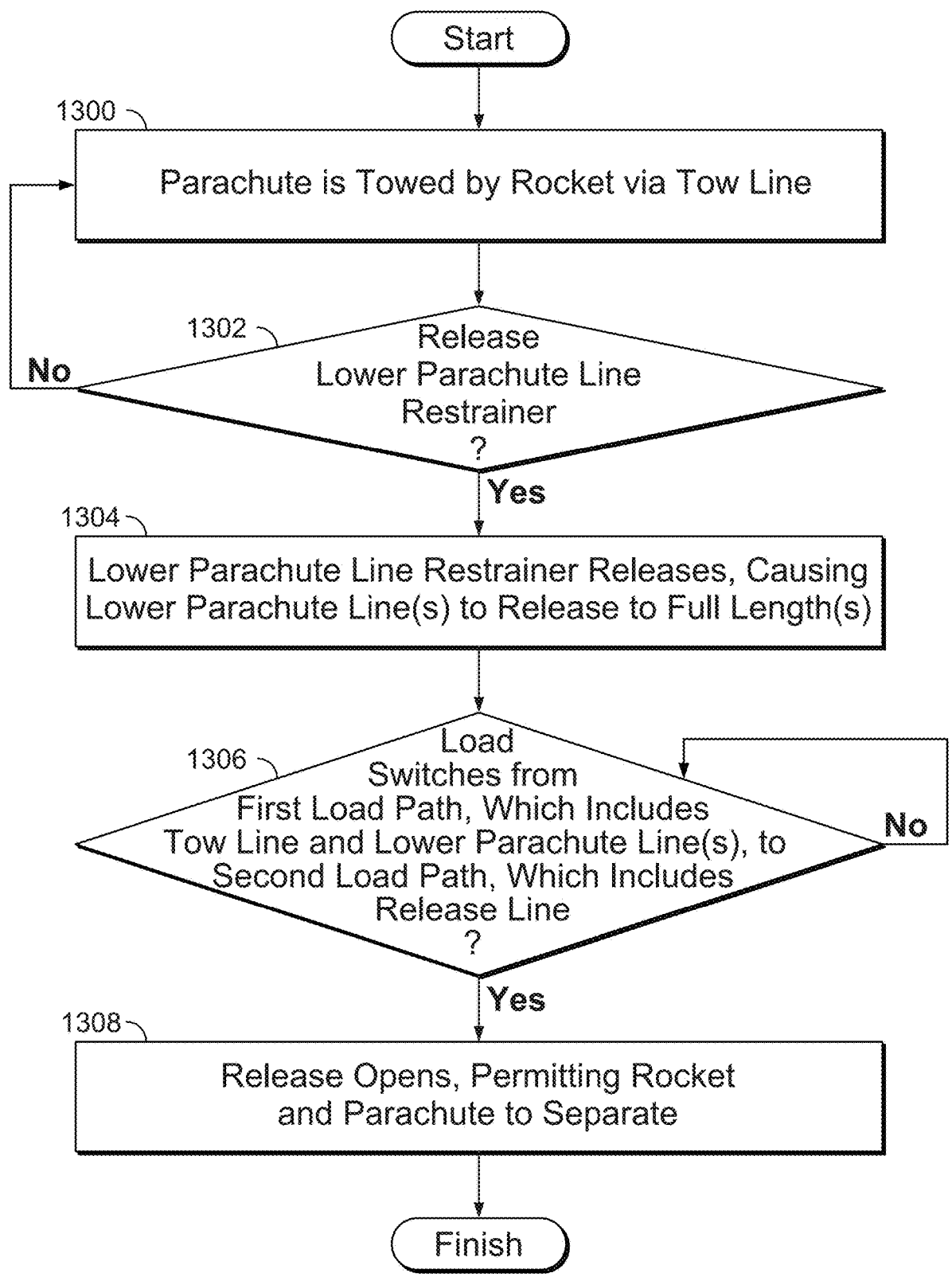
FIG. 13 is a flow diagram illustrating an embodiment of a process to deploy a parachute, including release of a rocket.

FIG. 13 is a flow diagram illustrating an embodiment of a process to deploy a parachute, including release of a rocket. At 1300, a parachute is towed by a rocket via a tow line. For example, the rocket begins traveling upwards and away from the payload. As the rocket travels upwards, a release is first pulled out from being stowed (e.g., the rocket is attached to the release), followed by a canopy of the parachute, followed by suspension lines of the parachute. Either suspension lines or a riser of the parachute is held in a lower parachute line restrainer. See, for example FIG. 11C.

At 1302, it is determined whether to release a lower parachute line restrainer. For example, a lower parachute line restrainer may be designed to release if the lower parachute line restrainer is subjected to a force greater than a first threshold force. In the event the lower parachute line restrainer is not subjected to a force greater than the first threshold force, the parachute continues to be towed by the rocket via the tow line. For example, the rocket continues pulling upwards on the tow line. The payload continues exerting a downwards force on the tow line. See, for example, FIG. 11C.

In the event it is determined to release the lower parachute line restrainer, at 1304 the lower parachute line restrainer releases, causing the one or more lower parachute lines to release to their full lengths. In some embodiments, the lower parachute line restrainer effectively shortens the lengths of the one or more lower parachute lines and they are restored to their full length following the release of the lower parachute line restrainer. See, for example FIG. 11C where the lower parachute lines are folded and tied using the lower parachute line restrainer, which reduces their effective length. The release of the lower parachute line restrainer may comprise breakage, snapping, fraying, or any other release. The change in relative lengths causes the tow line to become slack (e.g., because its effective length increases). In some embodiments, the release line eventually becomes taut (e.g., because the increase in the effective lengths of the lower parachute lines causes the load path which includes the release line to be shorter than the load path which includes the now-released lower parachute lines).

At 1306, it is determined whether a load switches from a first load path which includes the tow line and the lower parachute lines to a second load path which includes a release line. For example, because the lower parachute lines are now released, that load path now has a longer effective length than the load path which includes the release line. Eventually, the load path which includes the release line will be pulled taut, switching the load onto that line. See, for example, FIG. 11E.

In the event the load switches from the first load path which includes the tow line and the lower parachute lines to the second load path which includes the release line, at 1308 the release opens, permitting the rocket and the parachute to separate. In some embodiments, the release line is configured to open the release if a second threshold force is exceeded (e.g., the tow line and release line are configured to separate from the release in the event the release line experiences a force greater than the second threshold force). For example, one or both of the lines may be released from a latch or cut using a cutter. More detailed examples of the release are described below. If the load does not switch from the first load path to the second load path, the process may continue to check whether this condition is satisfied.

In some embodiments, the release remains with the rocket. The tow line and the release line separate from the release, allowing the parachute to be separated from the rocket and released. See, for example, FIG. 11F.

The following figure provides some context for the process of FIG. 13 (e.g., with respect to which line is bearing the load at various steps in FIG. 13).

Figure 14:
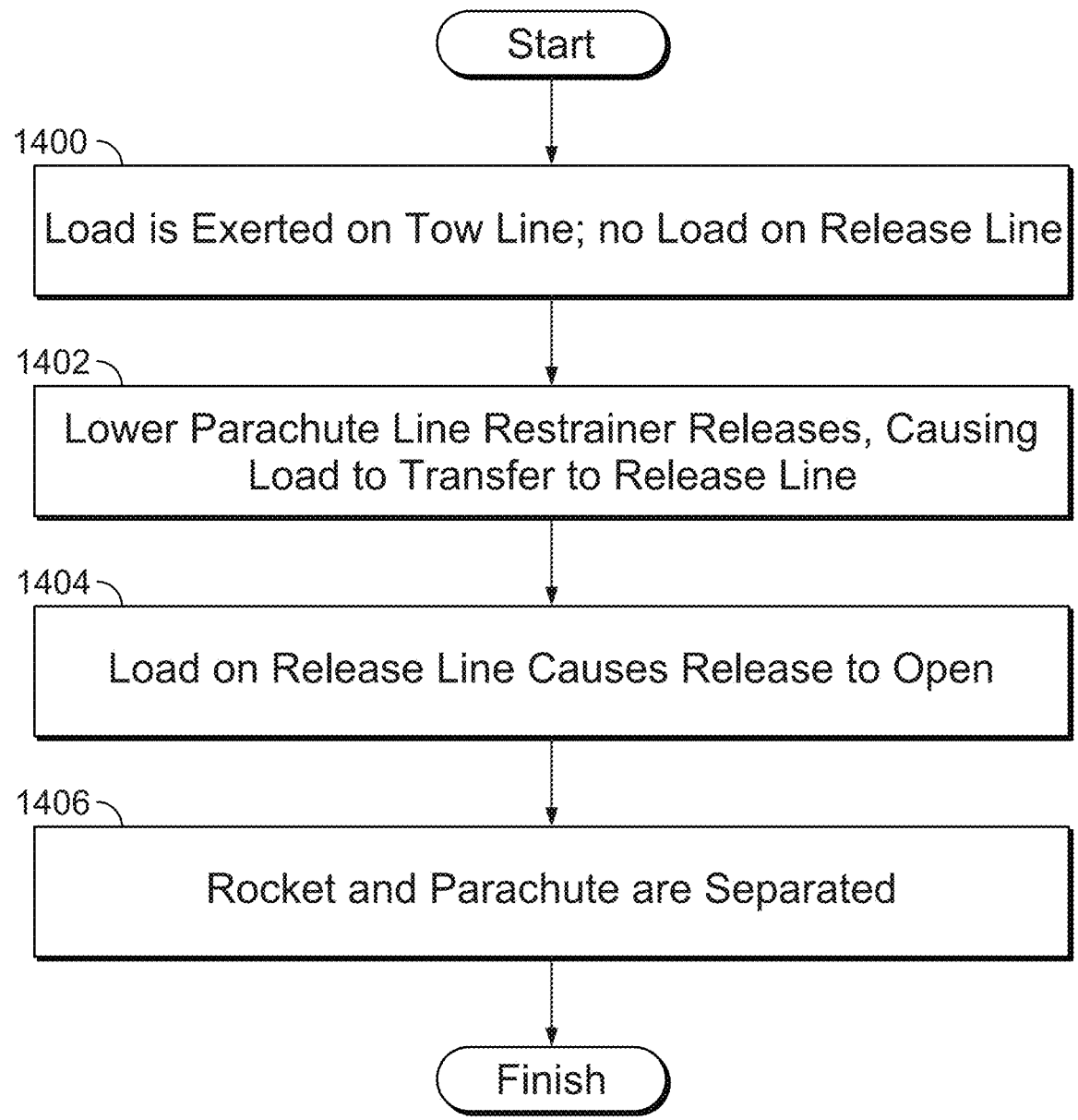
FIG. 14 is a flow diagram illustrating an embodiment of a parachute deployment process with load-bearing context.

FIG. 14 is a flow diagram illustrating an embodiment of a parachute deployment process with load-bearing context. In this example, context for various steps in FIG. 13 is provided, primarily with regard to which line is bearing the load at various steps. In some embodiments, both the tow line and the release line are under no load at the beginning of parachute extraction (e.g., before the rocket is ignited). Both lines are slack as the rocket begins to propel away from the payload. Two load paths are available that connect the rocket and the payload. A first load path including the tow line is (initially) shorter than a second load path including the release line (e.g., because one or more lower parachute lines are wound up and tied, effectively shortening them). As the distance between the rocket and the payload reaches the length of the first load path, line elements in the first load path become taut and are under load. The second load path is not loaded and line elements in the second path are slack. At 1400, the tow line is under load and there is no load on the release line. In the context of FIG. 13, step 1400 may describe step 1300.

At 1402, the lower parachute line restrainer releases, causing load to transfer to the release line. This step relates to steps 1304 and 1306 in FIG. 13. Release of the lower parachute line (see step 1304 in FIG. 13) causes the first load path to be longer than the second load path by extending the (e.g., effective) length of a line element of the first load path (e.g., a riser or suspension lines). In some embodiments, both load paths are momentarily not loaded upon the extension of length of the first load path. As the distance between the rocket and the payload reaches that of the second load path, either due to the payload dropping or the rocket propelling upwards, line elements in the second load path such as the release line are pulled taut. See, e.g., step 1306 in FIG. 13. In some embodiments, the second load path experiences only a small load before triggering the release to open. The full line load of the tow line may not be transferred to the release line.

At 1404, the load on the release line causes the release to open. See step 1308 in FIG. 13. In some embodiments, the lower parachute line restrainer is configured to release when the parachute is fully extracted. In quick succession, the release is subsequently opened which allows separation of the rocket and parachute. The tow line experiences a large load (e.g., which is good for deploying the parachute quickly and at high speed and/or low altitudes) whereas the release line experiences a small load (e.g., which is good for little or no recoil) before quickly triggering release. Once the parachute is fully extracted, the rocket is no longer needed.

At 1406, the rocket and the parachute are separated. The rocket is safely removed without causing a rebound or reactionary movement from the parachute.

As described above, a release may comprise a variety of components. The following figures describe some examples where the release includes a latch and a cutter. For clarity, the exemplary release is described at various points at time.

Figure 15A:
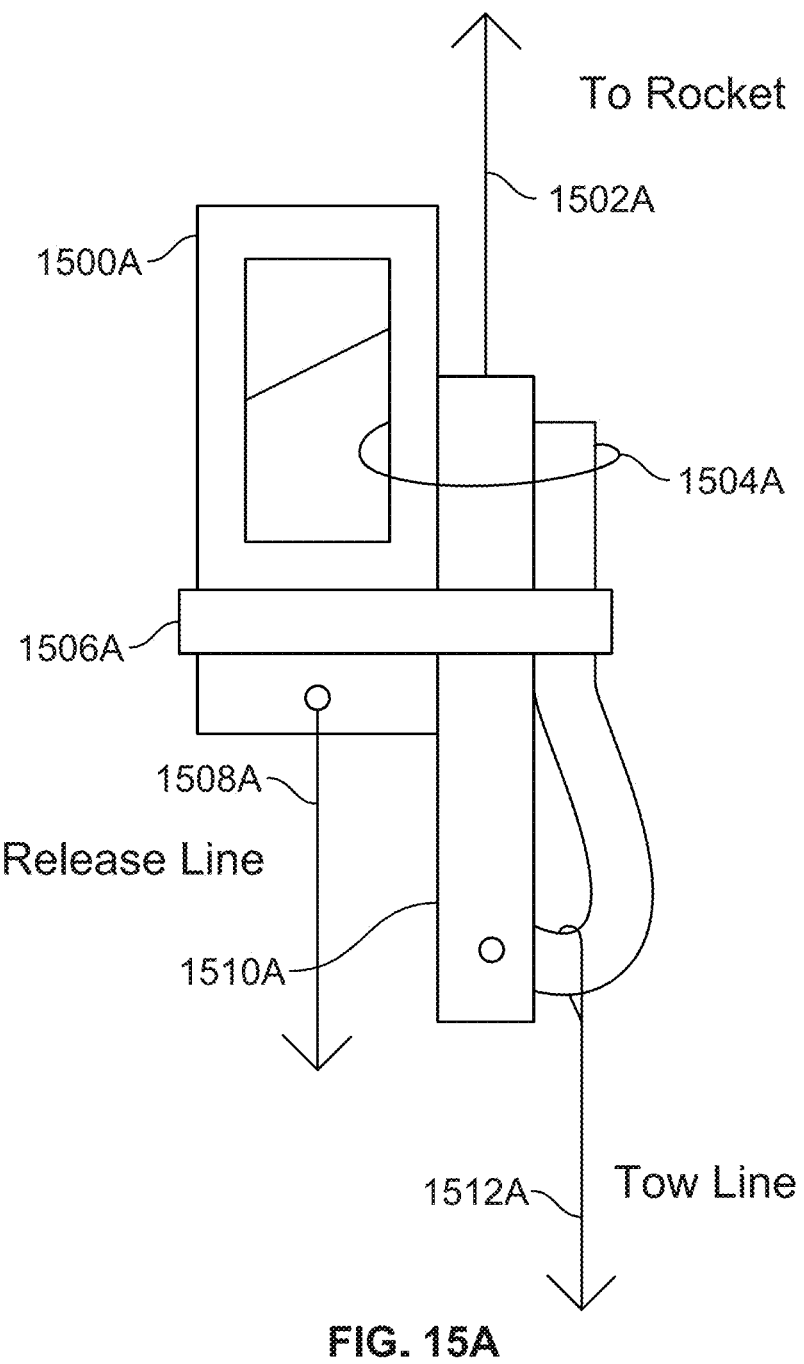
FIG. 15A is a diagram illustrating an embodiment of a release comprising a latch and a cutter.

FIG. 15A is a diagram illustrating an embodiment of a release comprising a latch and a cutter. In some embodiments, release 1004 of FIG. 10 is implemented as shown here. In this example, the load on the release line causes a cutter to be pulled downwards. The cutter is pulled down on a line, binding, or wrapper that holds a latch shut, causing the latch to open. A tow line held in the latch is released.

In the example shown, cutter 1500A and latch 1510A are positioned adjacent to each other. Latch 1510A as shown comprises a rectangular component and a curved component. Generally speaking, the latch is U-shaped with a hinge so that the curved part can swing away from the rectangular part. In this example, the curved part is shaped to provide a mechanical advantage such that the high tow line load can be reacted by a lower latch restrainer load on 1504A. This allows the latch restrainer to be smaller, which makes it easier to cut (e.g., it lowers the cut and/or release load).

Latch restrainer 1504A as shown holds latch 1510A in a closed position (e.g., with all parts of the latch forming a continuous loop without an opening or break). For example, the latch restrainer clamps two top ends of the latch together so that the latch cannot open. Latch restrainer 1504A may comprise a line or a strip of fabric. In this example, latch restrainer 1504A is made of a material that is able to be cut with a blade, such as cotton or nylon.

In the example shown, latch restrainer 1504A loops through cutter 1500A. In some embodiments, latch restrainer 1504A is exposed to a blade of the cutter through some other configuration or relative positioning of the blade and latch restrainer. For example, a blade is able to access and cut through the latch restrainer based on relative positions of the cutter and latch. In some embodiments, the latch restrainer is threaded through holes in the latch and/or cutter. For example, the latch restrainer comprises a line that is threaded through a hole at the end of the rectangular component of the latch, a hole in an end of the curved component of the latch, and through a hole in the side of the cutter.

In the example shown, release system restrainer 1506A is positioned around cutter 1500A and latch 1510A. In various embodiments, the release system restrainer comprises a zip tie, a line, a strip of fabric, or any appropriate restrainer which tears or releases when sufficient force or load is exerted downward on release line 1508A and/or upward on line 1502A to the rocket. In some embodiments, the release system restrainer maintains the positions of the cutter and the latch relative to each other. For example, latch restrainer 1504A does not securely hold the positioning of the cutter and the latch by itself. The release system restrainer holds the cutter in a position where the blade of the cutter is not in contact with the latch restrainer. In some embodiments, the release system restrainer is configured to break or release under a specific threshold force. In the event the specific threshold force is exerted on the release system restrainer, cutter 1500A will move downward (e.g., due to tension in the release line) and cut latch restrainer 1504A, causing latch 1510A to open. For example, the release system restrainer breaks in the event the release line is under the second threshold force.

Tether 1502A is attached to the top of the latch 1510A as shown and attaches the latch to a rocket. Tow line 1512A is held inside of latch 1510A (e.g., tow line 1512A is threaded through or around latch 1510A). In some embodiments, tow line 1512A implements tow line 1008 of FIG. 10. As shown, the tow line has a loop at its end and the curved component of the latch is positioned in the loop. The tow line is not permanently attached to the latch. Release line 1508A extends from the bottom of cutter 1500A. In some embodiments, release line 1508A implements release line 1014 of FIG. 10.

Figure 15B:
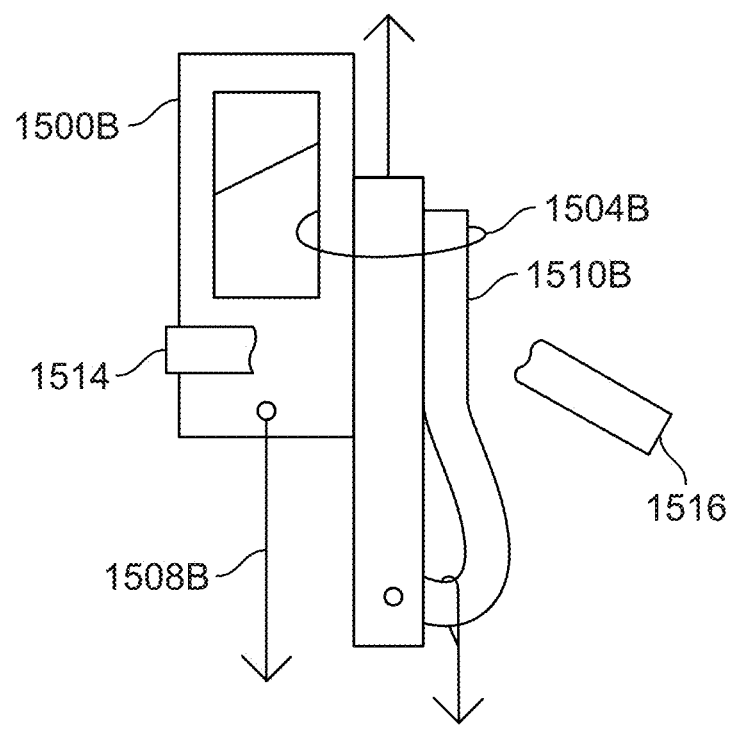
FIG. 15B is a diagram illustrating an embodiment of a release wherein a release system restrainer is broken.

FIG. 15B is a diagram illustrating an embodiment of a release wherein a release system restrainer is broken. In the event release line 1508B is under load, a force is exerted on the release system restrainer. In the event the force exerted on the release system restrainer exceeds the specific threshold force of the release system restrainer, the release system restrainer breaks or releases. In the example shown, release system restrainer pieces 1514 and 1516 have broken off. Cutter 1500B and latch 1510B are shown in their positions immediately as the release system restrainer is breaking off. In the example shown, latch restrainer 1504B remains intact.

Figure 15C:
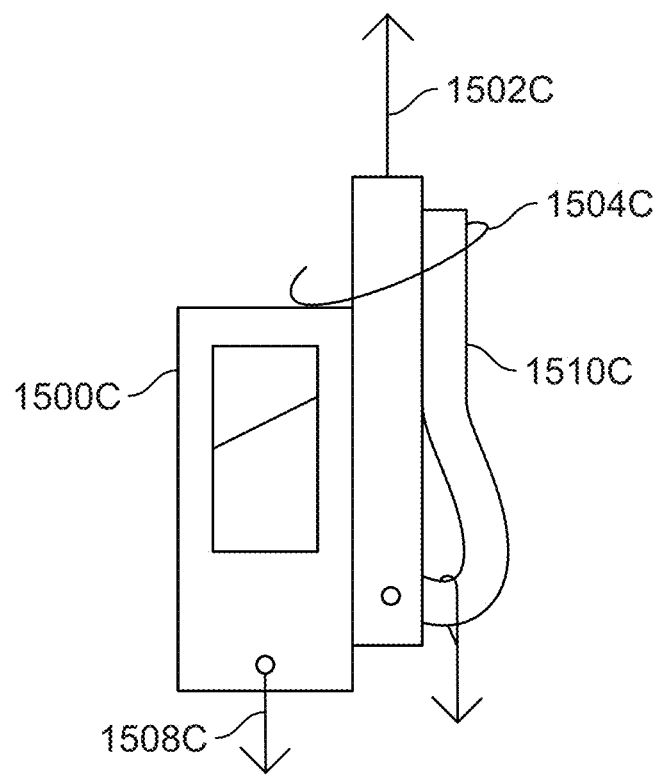
FIG. 15C is a diagram illustrating an embodiment of a release wherein a latch restrainer is broken.

FIG. 15C is a diagram illustrating an embodiment of a release wherein a latch restrainer is broken. In some embodiments, without the release system restrainer intact, the cutter falls downwards relative to the latch. For example, the cutter falls because it is being pulled by release line 1508C and the latch is towed upwards by the rocket via line 1502C. In the example shown, cutter 1500C drops in its position relative to latch 1510C, severing latch restrainer 1504C. Following the severance of latch restrainer 1504C, cutter 1500C remains attached to the parachute via release line 1508C but is no longer attached to latch 1510C or the rocket. Latch 1510C remains tethered to the rocket via line 1502C. At the moment shown, latch 1510C is in a closed position.

Figure 15D:
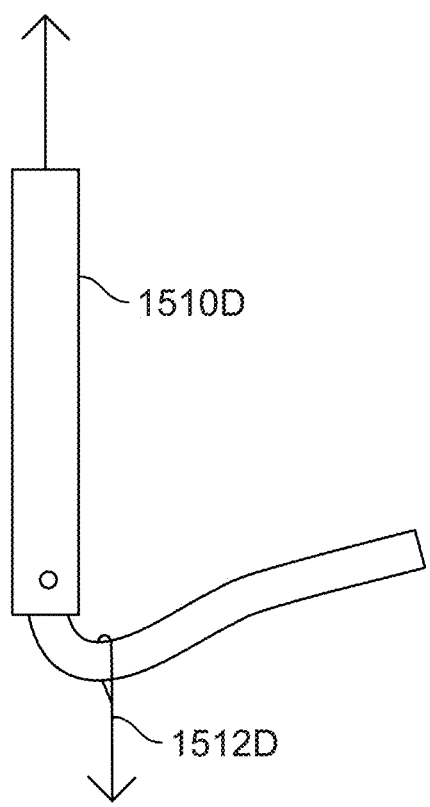
FIG. 15D is a diagram illustrating an embodiment of a release wherein a latch is open.

FIG. 15D is a diagram illustrating an embodiment of a release wherein a latch is open. After the latch restrainer is cut, the latch opens (e.g., the curved part of the latch has rotated about a hinge, causing it to separate from the rectangular part of the latch). Latch 1510D is shown in an open position. Tow line 1512D as shown remains on the curved component of latch 1510D. As the rocket tows latch 1510D up and away, tow line 1512D slips off of latch 1510D. In some embodiments, a small additional load on tow line 1512D causes the tow line to come off of latch 1510D. For example, as the rocket continues flying and the payload continues dropping, tow line 1512D is pulled taut and pulled off from latch 1510D. In various embodiments, the two halves of the latch may separate to various degrees (e.g., nearly 180° if desired) by adjusting or configuring the hinge as desired. In some embodiments, the two halves of the latch may separate completely after the latch opens.

Because the tow line 1512D slips off of open latch 1510D, there is very little recoil when the rocket separates from the parachute. In contrast, if a load path (e.g., bearing all of the load) were directly cut or otherwise severed, there would be a significant amount of recoil because of the tension or load on the line prior to the line being cut. As described above, a large amount of recoil is undesirable in some aircraft applications, which makes the techniques described herein useful.

Figure 15E:
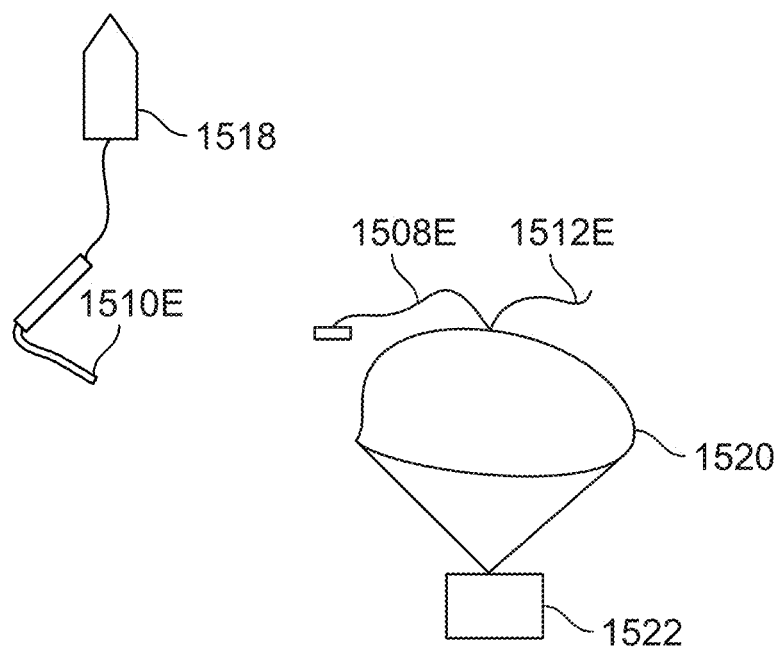
FIG. 15E is a diagram illustrating an embodiment of a parachute deployment system following separation of the parachute and a rocket.

FIG. 15E is a diagram illustrating an embodiment of a parachute deployment system following separation of the parachute and a rocket. The example shown provides an overall view of the parachute deployment system following opening of the release. In the example shown, rocket 1518 is attached to latch 1510E. After separating, the rocket may tow the latch for a distance and then begin to drop. In some embodiments, the rocket has its own recovery system (e.g., a parachute).

Release line 1508E and attached cutter remain attached to parachute 1520. Tow line 1512E (and upper parachute lines and/or crown lines) also remains attached to parachute 1520. As shown, parachute 1520 is completely filled and is attached to payload 1522.

Figure 16:
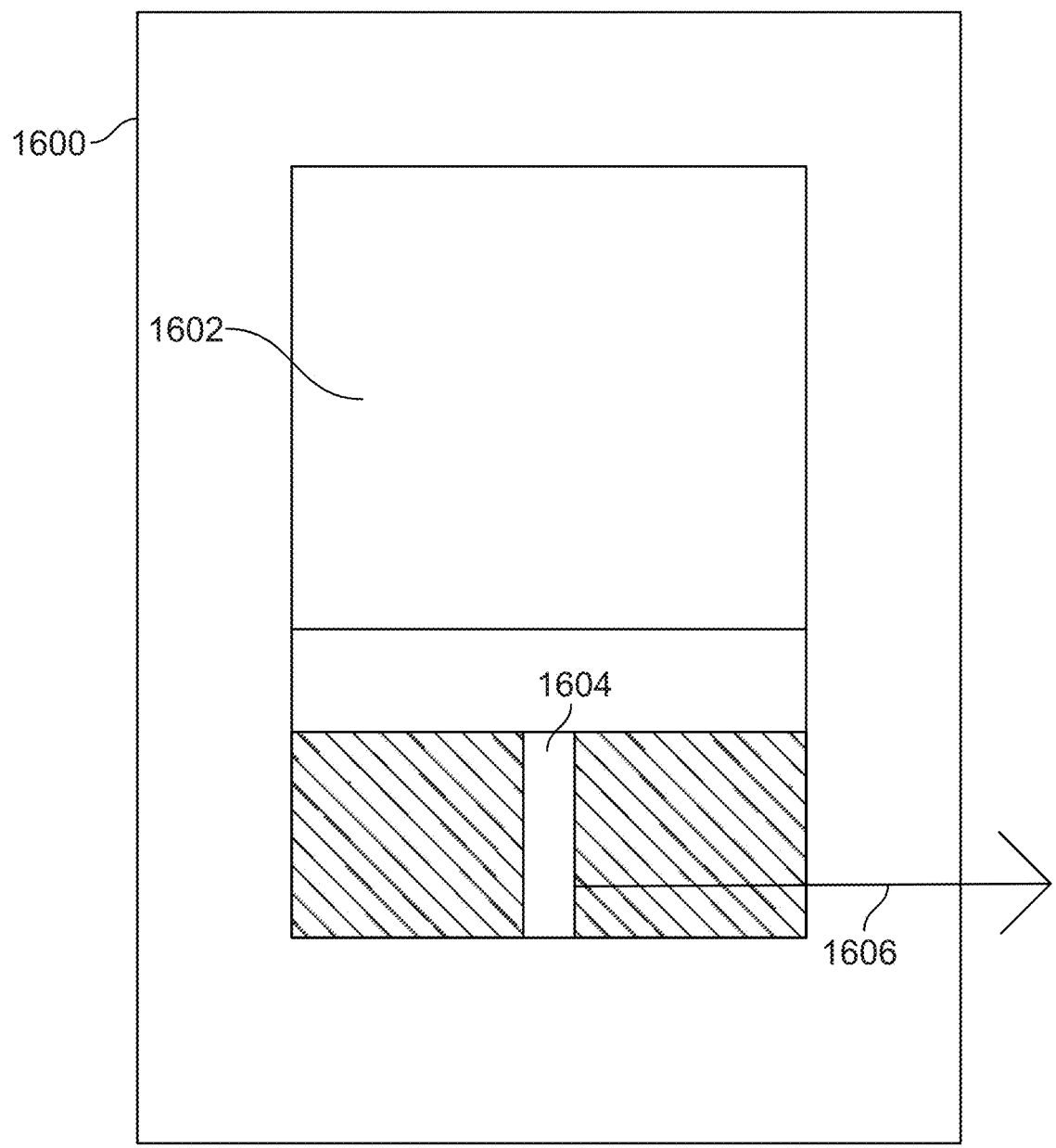

FIG. 16 is a diagram illustrating an embodiment of a cutter with a channel to thread the latch restrainer through. In various embodiments, the cutter is configured in different ways. In this example, vibrations through lines, movement of the rocket/payload, or environmental factors such as wind may cause the blade of a cutter to come into contact with the latch restrainer earlier than desired (e.g., when the release line is not under load). To address this, the exemplary cutter shown here is configured to minimize chances of accidental severance of the latch restrainer (e.g., caused by vibrations, slipping, etc.).

In the example shown, cutter 1600 comprises a blade that is held in a recessed area within a frame. For example, blade 1602 is secured such that it cannot rattle or move (e.g., prematurely) from its position in the cutter. Latch restrainer 1606 is threaded through a small channel or window in the cutter. Channel 1604 is a slim opening through the cutter that allows blade 1602 to be pulled down on the latch restrainer and cut the latch restrainer. Using a secured blade and a small channel of access (e.g., through which the latch restrainer is threaded) decreases the chances of unintentional and/or premature cutting of the latch restrainer.

Figure 17:
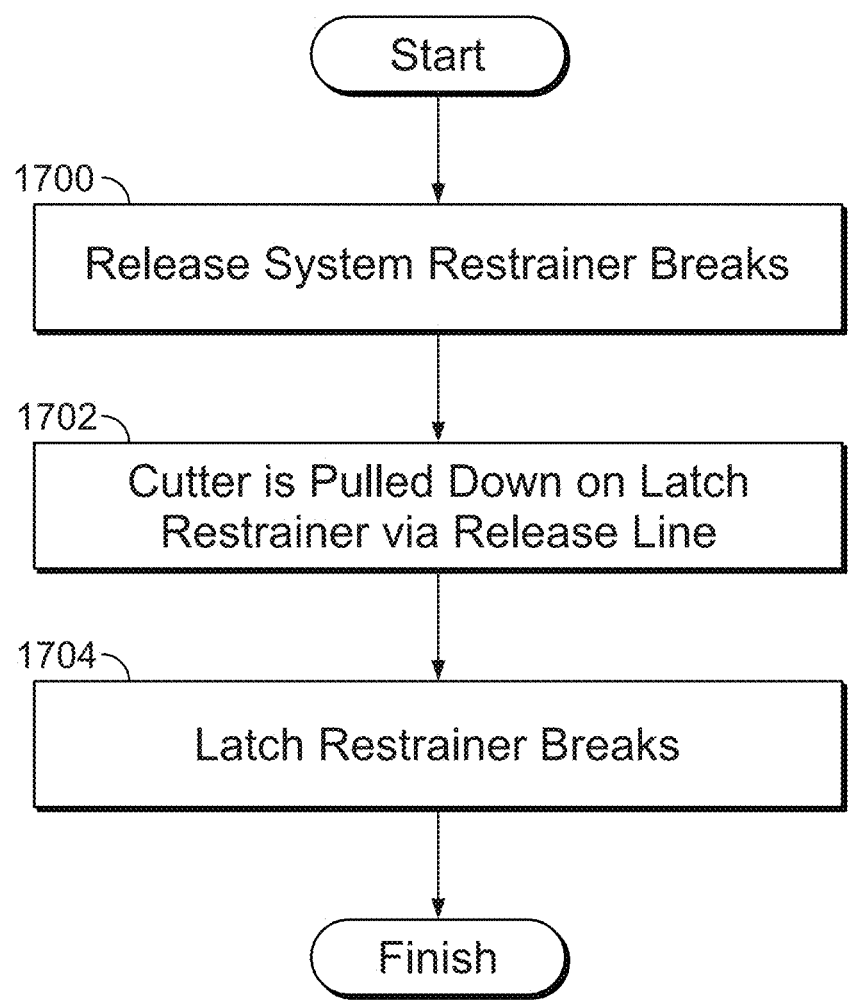
FIG. 17 is a flow diagram illustrating an embodiment of a process to open a release.

FIG. 17 is a flow diagram illustrating an embodiment of a process to open a release. In some embodiments, the process is used at step 1308 in FIG. 13. At 1700, the release system restrainer breaks. For example, the release system restrainer breaks after a threshold force is exerted on the release line. The release line may be under load following the release of the lower parachute line restrainer, which changes the load path from one including the tow line to one including the release line.

At 1702, the cutter is pulled down on the latch restrainer via the release line. For example, the latch restrainer and cutter move relative to each other, causing the blade of the cutter to cut the latch restrainer.

At 1704, the latch restrainer breaks. For example, the latch restrainer may be a line or tie that is cut. In some embodiments, the latch opens in the event the latch restrainer breaks. For example, in the previous figures, the latch has a hinge and part of the latch falls open by rotating on the hinge.

As described above, a release may comprise a variety of components. The following figures describe some examples of a release having a soft pin.

Figure 18A:
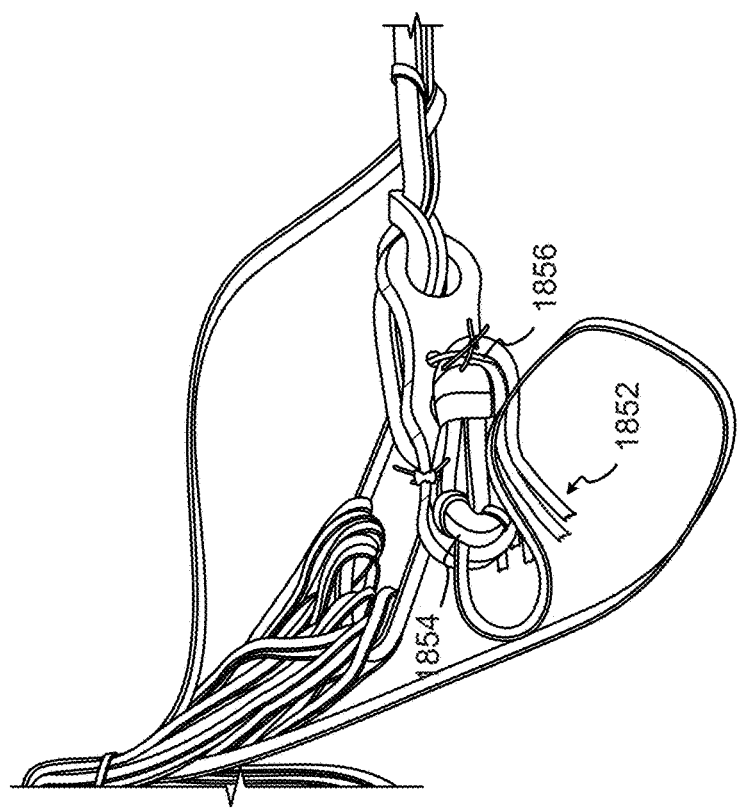
FIG. 18A is a diagram illustrating an embodiment of a soft pin release assembly.
Figure 18B:
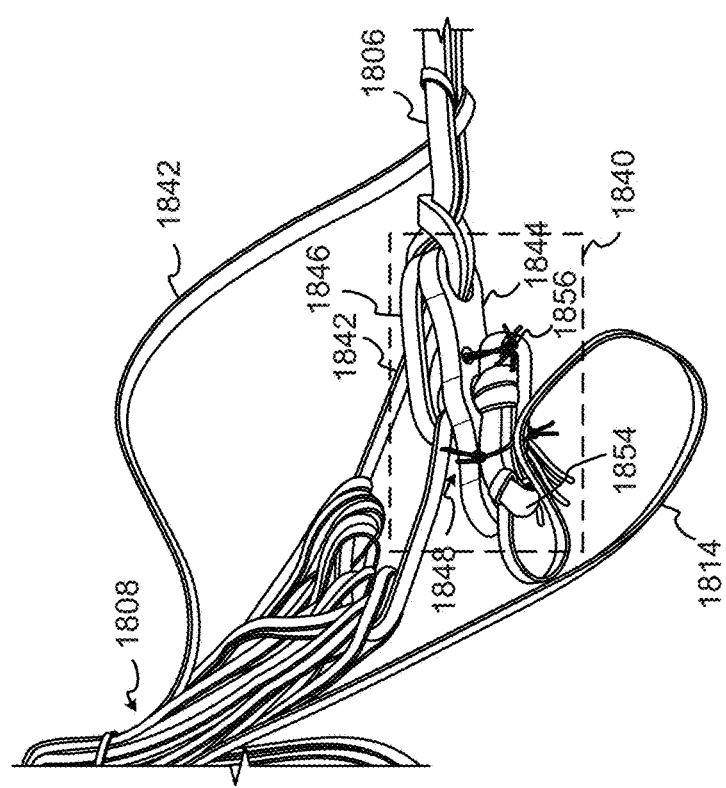
FIG. 18B shows another view of an embodiment of a soft pin release assembly.

FIG. 18A is a diagram illustrating an embodiment of a soft pin release assembly. Soft pin release assembly 1840 is adapted to disengage a rocket from a parachute/payload. Soft pin release assembly 1840 is an example of how release 1004 of FIG. 10 can be implemented. FIG. 18B shows another view of an embodiment of a soft pin release assembly.

The soft pin release assembly includes release back plate 1844, soft pin 1854, first line 1842, second line 1846, guide loop 1856, and break ties 1848. The soft pin release assembly is passively actuated when a load on release line 1814 reaches a threshold force (also called a release force). The soft pin release assembly exploits the rocket momentum and thrust when a parachute reaches a fully extracted state, actuating in response to the release force exerted by the rocket momentum and thrust.

In the example of FIGS. 18A and 18B, the release assembly is in an unactuated state. Release back plate 1844 is structured to accommodate soft pin 1854. The release back plate can be made of an inflexible material such as metal, plastic, and the like. The release back plate can be made of a flexible material such as nylon, webbing, and the like. Here, soft pin 1854 is held in place against release back plate 1844 by a loop of the second line 1846 (that passes around a portion of the soft pin 1854 and through an opening of the release back plate), guide loop 1856, and break ties 1848.

Soft pin 1854 is adapted to minimize mass and inertial loading under acceleration, for example around 500-1000 g acceleration. Soft pin 1854 may be made of a flexible material such as cloth, rope, plastic, and the like in order to achieve this property or performance. Unlike conventional metal pins, a soft pin is able to avoid backing itself out of the release back plate. Referring to FIG. 18B, pin pigtails 1852 prevent the soft pin from backing itself out even when there is high inertial loading (e.g., load directed to the left of the soft pin). In some embodiments, soft pin 1854 is arranged such that approximately half of the pin mass is on each side of guide loop 1856 to prevent the pin from sliding in or out under inertial loads.

Guide loop 1856 reacts to inertial loading of the soft pin (e.g., at 500-1000 g) as the assembly is accelerated, and does not break. Guide loop 1856 is adapted to guide the motion of the soft pin during actuation of the release as more fully described below. In some embodiments, the guide loop is made of a hard material or a ring.

Break ties 1848 are adapted to retain the soft pin against the release back plate below the release force, and break in response to loading of the release line (e.g., at the release force). When a release force is met or exceeded, release line 1814 tensions, causing the break ties 1848 to break (not shown). Consequently, soft pin 1854 slips away from the release back plate 1844, and crown lines 1808 are disengaged from release back plate 1844 and the first line 1842. The rocket tow line 1806 tows the rocket away from the parachute/payload. Break ties 1848 can be adapted to respond to a desired release force by selecting a material with a desired strength or by positioning the break tie at various locations along the release back plate.

This release assembly is an example of a two-ring release that reduces the force needed to release compared with other types of assemblies. The two-ring release includes two line lengths in series (here, first line 1842 and second line 1846). Here, the force required for the pin to react to the rocket tow force is around a quarter of the rocket tow force. When (around) the force required to break ties 1848 and pull the pin is reached, the release is actuated. Break ties 1848 break, allowing soft pin 1854 to slip away from release back plate 1844, freeing crown lines 1808 and the parachute/payload to disengage from the rocket assembly with minimal recoil (e.g., which means less falling or dropping of any attached aircraft or person before the parachute (re)inflates).

Also shown in FIGS. 18A and 18B are other components of a parachute deployment system including crown lines 1808, rocket tow line 1806, and release line 1814. These components are like those described in the other figures unless otherwise described here. Referring to FIG. 19A, rocket tow line 1902 corresponds to rocket tow line 1806 of FIG. 18A. Returning to FIG. 18A, crown release lines 1808 are individually looped through first line 1842 as shown. First line 1842 is looped through second line 1846, which is then looped through soft pin 1854 to keep the soft pin in place when the release is in an unactuated state as shown. In some embodiments, the crown lines are made of a low mass material to decrease and avoid interference with fast inflation after release.

Bridle 1842 is arranged to run from the rocket tow line to a rocket parachute. In a stowed state, the bridle is tucked inside the parachute canopy such as canopy 1010 of FIG. 10. The bridle runs to a rocket parachute such as parachute 1202 shown in FIG. 12. The rocket parachute canopy is tucked inside a main parachute canopy.

Rocket tow line 1806 runs from the release back plate to the rocket. When the release is actuated, the rocket tow line remains coupled to the rocket, and pulls the release back plate away from the crown lines 1808 to free the parachute/payload from the rocket assembly including the back plate with minimal recoil.

Release line 1814 runs between soft pin 1854 and a parachute centerline that runs from the parachute apex to the suspension line confluence point. When a rocket is deployed, the release line is extended as more fully described with respect to FIGS. 11A-11F. In response to tensioning of the release line, the release is actuated by the breaking of the break ties 1848. In various embodiments, the release line has ample slack to avoid actuating the release prematurely.

In contrast to the release shown in FIGS. 15A-16, the release of FIGS. 18A and 18B does not require a cutter, which may reduce the weight and increase the reliability of the parachute deployment system. In various embodiments, the soft pin release assembly is tolerant of packing under pressure in a can, which facilitates minimization of stowed parachute volume and clean packaging. The soft pin release assembly, in various embodiments, tolerates chaotic extraction and snatch from the can, and does not release prematurely due to rips, tears, or inertial loads. For example, the soft pin release assembly is agnostic to rotation. On release, the soft pin release assembly avoids tangling and snags. In an alternative embodiment, the release assembly is implemented by a snap shackle.

The following figures show examples of a parachute tow and release system with canopy extraction controlled by drag surface, e.g., controlled drag during parachute extraction. A parachute initiates inflation prior to beginning its downward fall by allowing air to flow in through the parachute crown and spread the skirt for easier inflation once the downward stroke begins. The period during which the parachute is extracted and air flows in through the crown is called the extension stroke, and the beginning of the falling is called the downward stroke. The release mechanism disclosed accommodates high extraction speeds in which the parachute is extracted at around 50-100 mph relative to the airstream. Typically, fast extraction of the parachute causes the parachute to slam against its full extension point, which in turn loads the lines of the parachute and causes recoil. Recoil causes a payload to lose altitude, which is undesirable because of potential payload damage or loss and less time or height for the parachute to slow down any attached aircraft or person. The techniques described here allow control of the extension of the parachute.

In one aspect, the extension stroke can be damped by controlling extension (e.g., in a radially outwards direction) of upper parachute lines. In some embodiments, extension damping is tunable by providing a line constrainer. Example line constrainers are shown in FIGS. 19A and 19B. Because the type/level of damping can be selected or otherwise controlled to some degree, the parachute need not extend with a large amount of momentum and slam against its extension point. Instead, the extension stroke is controlled and the parachute can be extended more slowly towards its extension point. The level of extension is a parameter that can be set or selected.

The following figures show examples of an exemplary parachute deployment system having a line constrainer. The line constrainer restricts extension of upper parachute lines to provide a desired level of extension damping.

FIG. 19A is a diagram illustrating an embodiment of a parachute deployment system including a line constrainer associated with a first area, A1. In the example shown, the system includes rocket 1900, release 1904, line constrainer 1920, and parachute 1910. Each of the system components functions like those of FIGS. 11A-11F unless otherwise described here.

Rocket 1900 is adapted to extract the parachute from a container. For example, in an unactuated state, the parachute is stored in a cavity or compartment in payload 1918. Prior to deployment, the parachute may be folded inside the cavity, as more fully described with respect to FIGS. 24 and 25. To actuate the parachute, the rocket deploys and pulls the parachute from the container. The momentum of the rocket causes release 1904 to actuate at desired conditions, separating the rocket from the parachute (as described above).

Release 1904 is adapted to disconnect rocket 1900 from parachute 1910 with minimal recoil. The level of extension damping or drag during parachute extraction can be adjusted by selecting certain parameters or characteristics of the line constrainer 1920 as will be described in more detail below. When the load pulls on the release, the release causes the parachute to detach from the rocket. The conditions that cause the release to disengage the parachute from the rocket is more fully described with respect to FIG. 21E. In various embodiments, the release includes a latch, a cutter, a pin (e.g., a soft pin), or the like. In the example shown, rocket 1900 is connected to release 1904 via rocket tow line 1902. In some embodiments, rocket 1900 is permanently attached or connected to release 1904. For example, release 1904 is designed to remain with rocket 1900 following separation of rocket 1900 and parachute 1910. The release can disengage from the parachute in a variety of ways as described with respect to release 1004 of FIG. 10 and FIGS. 15A-18B.

Parachute 1910 is adapted to facilitate smooth flight of payload 1918. For example, the parachute is used to help a payload such as an aircraft gently land at a desired location. Parachute 1910 includes a canopy, upper parachute lines 1908, and lower parachute lines 1912 (also called suspension lines). In this example, the upper parachute lines also function as tow lines, and the two terms are used interchangeably. In some embodiments, the tow line is separate from the upper parachute line such as in the system of FIG. 10. Tow lines 1908 are adapted to tow the parachute, which is different from the rocket tow line 1902 adapted to tow the rocket.

Tow line 1908 is attached to release 1904 at its upper end. At its lower end, tow line 1908 is attached to a canopy of parachute 1910. In contrast to the example of FIGS. 11A-11F, here the upper parachute lines 1908 are directly attached to the release. When the parachute is released from release 1904, each of the upper parachute lines individually detaches from the release. This decreases the mass upstream of the parachute that could potentially interfere with the opening of the parachute.

In various embodiments, the upper parachute lines are attached to the canopy in the middle of the canopy, between an apex and outer edge of the canopy. In some embodiments, attaching the tow line to the middle of the canopy or lower on the canopy than its apex allows lower sections of the canopy to be pulled out quickly, providing even distribution of tension across lower parachute lines. In some embodiments, the canopy is stored in the can in a manner that allows the canopy to inflate quickly as described with respect to FIGS. 24 and 25. The ability to quickly extract and inflate the parachute may be especially helpful at lower flight altitudes (e.g., on the order of a few meters), where a delay in parachute inflation may cause a payload (e.g., an attached aircraft or person) to be damaged or lost.

Suspension lines 1912 allow a payload to be suspended from the parachute. Here, the suspension lines 1912 and a release line (not shown) are attached at their bottom ends to riser 1917. Riser 1917 attaches payload 1918 to parachute 1910 via lower parachute lines 1912. Payload 1918 may be any object benefitting from a parachute such as an aircraft, package, human, and the like. In some embodiments, the release line is tied to an apex of canopy 1910, which in turn is tied to the center line, which is tied to the riser.

Figure 21C:
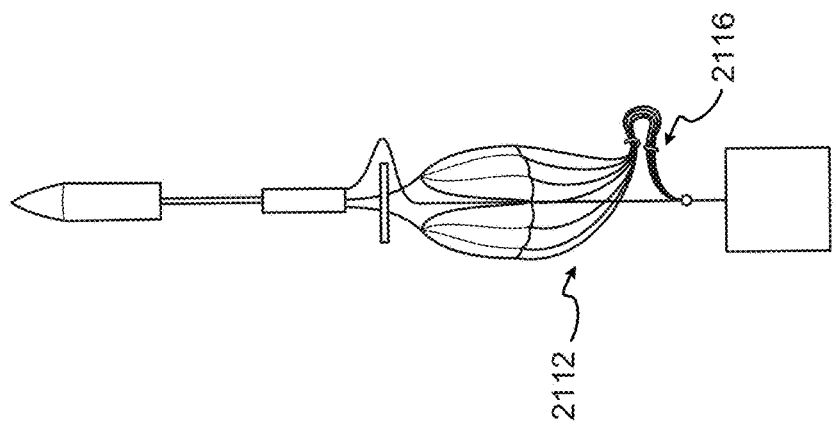
FIG. 21C is a diagram illustrating an embodiment of a parachute deployment system during release of a lower parachute line restrainer.
Figure 21B:
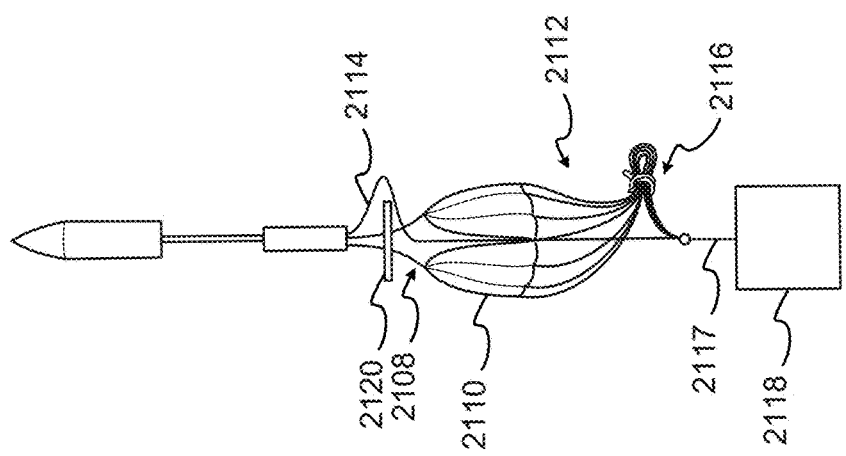
FIG. 21B is a diagram illustrating an embodiment of a parachute deployment system while the parachute is towed via a tow line.

In various embodiments, a portion of the suspension lines is held in a lower parachute line restrainer (not shown) such that the length of the suspension lines is shortened, as more fully described with respect to FIG. 21B. For example, the lower parachute line restrainer can be implemented by a bight, a tied or sewed cloth, a thin plastic tube, a cardboard loop, or the like. The lower parachute line restrainer is configured to release under a threshold force (e.g., due to the rocket pulling away from the parachute). For example, the lower parachute line restrainer is configured to break, rip, tear, or open when subjected to the threshold force.

The number of upper parachute lines, suspension lines, and riser lines can be selected based on the payload or flight conditions. For example, several upper parachute lines (2, 4, 10, 20, or more) can be positioned equidistantly on the canopy. More lines may attach components more securely to each other, but would be heavier than fewer lines. In some embodiments, riser 1917 is implemented by a webbing.

Line constrainer 1920 is adapted to restrict an extent to which the upper parachute lines are able to extend away (e.g., radially outward) from a longitudinal axis (dashed line A1) of the parachute. In various embodiments, the amount of extension damping is directly proportional to an area defined by the extent of the upper parachute lines. In FIG. 19A, the cross-sectional area of the dashed horizontal line through line constrainer 1920 is A1.

FIG. 19B is a diagram illustrating an embodiment of a parachute deployment system including a line constrainer associated with a second area, A2. The example system shown in FIG. 19B includes the same components as the system of FIG. 19A unless otherwise described here. Line constrainer 1930 restricts an extent to which the upper parachute lines are able to extend away from a longitudinal axis of the parachute to area A2. A2 is smaller than A1 because line constrainer 1930 restricts movement of the upper parachute lines to a greater degree compared with line constrainer 1920. In various embodiments, the damping drag force is proportional to the area corresponding to the extent to which upper parachute lines are able to extend away from a longitudinal axis of the parachute. Thus, the system in FIG. 19A has higher damping compared with the system in FIG. 19B.

There are many advantages to using the line constrainer to restrict movement of the upper parachute lines to parametrically tune extension damping. In one aspect, extension damping is tunable. This allows a system to be adapted for a variety of flight situations. For example, if an aircraft (payload of the parachute and rocket system) is expected to fly at relatively low altitude, then the line constrainer can be adjusted or sized to constrain the upper parachute lines to movement within a larger area, which corresponds to high damping. Unlike conventional means to constrain lower parachute lines, the line constrainers in the examples shown in FIGS. 19A and 19B constrain the upper parachute lines.

The sizing of a cutout in the line constrainer controls how much air passes through a mid-channel of the parachute. The shape of the canopy due to airflow through the canopy helps the parachute to inflate more quickly. For example, the larger cross-sectional area A1 of FIG. 19A relative to the cross-sectional area A2 of FIG. 19B means that the parachute of FIG. 19A will inflate more quickly when a similarly sized cutout allows air to pass through the line constrainer into the canopy on extraction. The operation of the parachute deployment system is more fully described with respect to FIGS. 21A-21F.

The line constrainer can be implemented by various materials. For example, the line constrainer can be made of a flexible material with holes through which the upper parachute lines pass. The line constrainer can be made of a rigid material. The line constrainer can be a variety of shapes such as a disk, polygon, or the like. In some embodiments, the line constrainer includes a cutout to promote airflow to facilitate quick parachute inflation. For example, the line constrainer can be a ring or other shape with a cutout. The following figures show examples of the line constrainer.

In some embodiments, one or more locking stows are used in place or in addition to the line constrainer. FIG. 22A to FIG. 22E show an example of a system with locking stows.

Figure 20B:
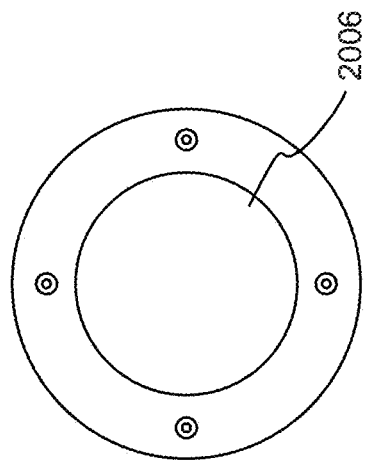
FIG. 20B is a diagram illustrating an embodiment of a circular line constrainer.
Figure 20A:
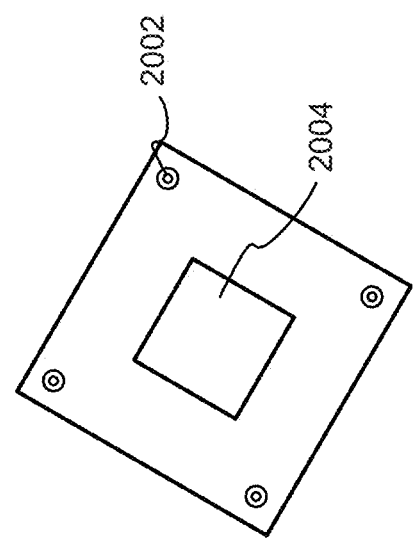
FIG. 20A is a diagram illustrating an embodiment of a rectangular line constrainer.

FIG. 20A is a diagram illustrating an embodiment of a rectangular line constrainer. In FIG. 20A, the line constrainer is rectangular with a rectangular cutout 2004. FIG. 20B is a diagram illustrating an embodiment of a circular line constrainer. In FIG. 20B, the line constrainer is circular with a circular cutout 2006.

The body of the line constrainer can be made of various materials. In some embodiments, the line constrainer is made of a flexible material such as nylon. For example, grommets in the line constrainer for line pass-through can be made of metal. In some embodiments, the line constrainer is made of an inflexible material such as metal or hard plastic with spaces for line pass-through. The cutout 2004 allows air to flow through the line constrainer. The cutout can be open, mesh, or the like.

In the embodiments shown here, grommets are provided on the line constrainer to guide crown lines into place in a parachute deployment system. For example, referring to FIG. 19A, a line constrainer such as the ones shown in FIGS. 20A and 20B is provided between a release 1904 and parachute 1910. Crown lines 1908 pass through the grommets of the line constrainer to (removably) couple the parachute to the release 1904. Returning to FIGS. 20A and 20B, four grommets 2002 are provided along the perimeter of the line constrainer. For example, the grommets may be provided near (e.g., within some threshold distance of) the perimeter. Although this example shows four grommets, any number of grommets (e.g., suitable for the number of crown lines in the parachute deployment system) may be provided.

The sizing of the line constrainer affects the level of extension damping. In various embodiments, the outer diameter (or perimeter) is proportional to a level of damping (because in these examples at least, the grommets are positioned near the outer diameter of the line constrainers shown). As discussed with respect to FIGS. 19A and 19B, a relatively large area bounded by the line constrainer causes higher damping than a smaller area. Thus, a line constrainer with a relatively larger diameter (or perimeter) causes higher damping than a line constrainer with a smaller diameter (or perimeter).

The sizing of the (e.g., center) cutout of the line constrainer affects the amount of air inflow through the line constrainer to the canopy causing the canopy to inflate. In various embodiments, the cutout 2004 is sized based on a desired level of air inflow. A relatively larger cutout permits more air inflow than a smaller cutout. The desired air inflow may depend on the size of a parachute canopy. Typically a smaller parachute requires less air flow to inflate than a larger parachute. The desired air inflow may depend on a target speed of parachute inflation. More air inflow permits a parachute to be inflated more quickly. Referring to FIGS. 20A and 20B, cutout 2004 is smaller than cutout 2006. Thus, a canopy of the same size would inflate more quickly in a system as shown in FIG. 20A as compared to a system that has the line constrainer shown in FIG. 20B. The shape of the cutout shown here is merely exemplary and is not intended to be limiting. The cutout can be sized to permit a desired volume of air inflow.

The following figures show examples of the exemplary parachute deployment system at various points in time in order to better illustrate how the parachute deployment system works and how it is able to disconnect the rocket with tunable extension damping (e.g., little or no recoil).

Figure 21A:
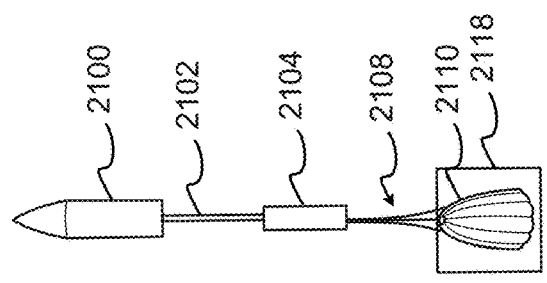
FIG. 21A is a diagram illustrating an embodiment of a parachute deployment system following rocket deployment.

FIG. 21A is a diagram illustrating an embodiment of a parachute deployment system following rocket deployment. In this state of deployment, rocket 2100 begins traveling away from can 2118 (here, substantially up), causing release 2104 (which is coupled to the rocket via rocket tow line 2102) to be pulled out from the can. The release is attached to the parachute via tow line 2108 and the release line (not shown). In this example, the crown lines are the same as the tow lines. Parachute 2110 remains stowed inside can 2118. In some embodiments, the canopy of the parachute is stored in the can in the manner more fully described with respect to FIGS. 24 and 25. The can is stored on or in a payload of the rocket. The can may comprise a cavity or compartment in an aircraft where the parachute deployment system is stored.

FIG. 21B is a diagram illustrating an embodiment of a parachute deployment system while the parachute is towed via a tow line. In this state of deployment, the rocket continues traveling away from can 2118, causing parachute 2110 to be pulled out from the can. This state is sometimes called the "initial extraction state." As shown, the extent to which the crown lines 2108 are able to extend away from a longitudinal axis of the parachute is restricted by line constrainer 2120. The lower parachute lines 2112 extend from the skirt of the parachute, and a portion of the lower parachute lines is held in lower parachute restrainer 2116, shortening the effective lengths of the lines. The lower parachute lines 2112 and release line 2114 are coupled to riser 2117.

In this state, the tow line 2108 is taut and the release line 2114 is slack. In some embodiments, the length of release line 2114 is longer than the combined length of the crown line 2108, canopy length between the crown line and lower parachute lines, and lower parachute lines held in lower parachute line restrainer 2116. In this initial extraction state, neither the tow line nor the release line are under load except for the load on the tow lines required to pull the canopy out of the can.

As the rocket travels farther away from the payload, the combined length of tow line 2108, suspension lines 2112, and riser 2117 are pulled taut. In response, the portion of the canopy between the tow line and lower parachute lines is also pulled taut. At this point, the parachute is fully extracted from the can. The rocket pulls upwards on the combined length while the payload exerts a downwards force on the combined length due to inertia. The tow line is under load, whereas the release line remains slack and is not under load. The load path from the rocket to the payload travels through the tow line, suspension lines held in the restrainer, and riser rather than traveling through the release line and riser because the release line is longer in length than the combined length of the tow line, suspension lines held in the restrainer, and intermediaries such as the portion of the canopy between the tow line and suspension lines or lines used to attach the tow line to the canopy.

FIG. 21C is a diagram illustrating an embodiment of a parachute deployment system during release of a lower parachute line restrainer. In this example, the lower parachute line restrainer is configured to release under a first threshold force. The lower line restrainer 2116 breaks into pieces as shown to allow the lower parachute lines to extend to their full lengths. In some embodiments, the lower parachute line restrainer is configured to release after the parachute is fully extracted from the can. For example, the first threshold force is equal to a force the lower parachute restrainer experiences in the event the lower parachute lines are pulled taut. In some embodiments, the first threshold force is equal to a force that the lower parachute line restrainer experiences in the event of sustained load on the suspension lines. For example, the lower parachute line restrainer will not break immediately in the event the suspension lines are pulled taut, but a short time after due to the forces exerted by the rocket and payload. In some embodiments, the first threshold force is determined based on experimental data.

The type of lower parachute line restrainer may be chosen based on the first threshold force. The lower parachute line restrainer may be calibrated based on the first threshold force. For clarity, lower parachute lines 2112 and lower parachute line restrainer pieces are shown pulled to the side so that they are not obscured by the release line. In various embodiments, the lower parachute lines may be pulled straight (e.g., between the rocket and payload) when the lower parachute line restrainer breaks or otherwise releases.

In the example shown, lower parachute line restrainer pieces have broken off of lower parachute lines 2112. The suspension lines as shown have been released from their taut, shortened position. The tow line is taut, and the release line is slack. As the rocket continues traveling upwards away from the payload, both lines may both be slack because both are too long to restrain the rocket initially. As the rocket continues traveling or the payload continues falling, load will eventually transition to the release line due to its shorter length compared to the longer combined length of the tow line, canopy portion, and lower parachute lines (no longer shortened by the lower parachute line restrainer). For simplicity, a lower parachute line restrainer is described in this example, but in other embodiments a restrainer is associated with a canopy line (e.g., in addition to or as an alternative to a lower parachute line).

Figure 21F:
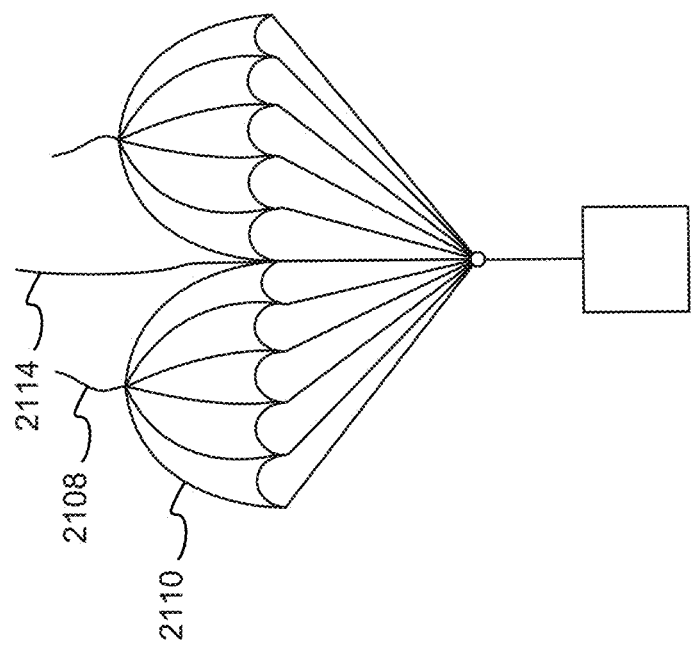
FIG. 21F is a diagram illustrating an embodiment of a parachute deployment system with a fully deployed parachute.
Figure 21E:
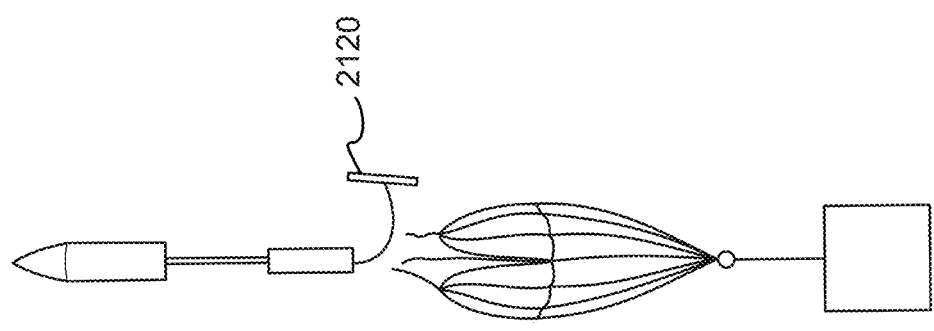
FIG. 21E is a diagram illustrating an embodiment of a parachute deployment system following separation of the parachute from the rocket.
Figure 21D:
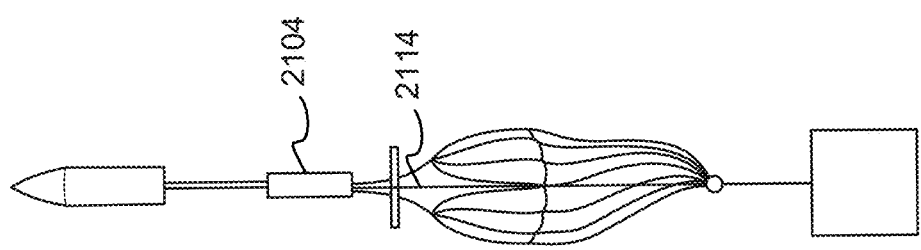
FIG. 21D is a diagram illustrating an embodiment of a parachute deployment system following the shifting of a load from a first load path to a second load path.

FIG. 21D is a diagram illustrating an embodiment of a parachute deployment system following the shifting of a load from a first load path to a second load path. Here, the load shifts to release line 2114. In the example shown, the lower parachute lines are at their full, unrestrained length. The lower parachute lines are slack because the load has shifted to release line 2114 such that the release line is taut. The load path from the rocket to the payload now includes release line 2114 and the riser. As described above, in some embodiments, the release line is attached directly from the release to the bottom of the suspension lines. In other embodiments, the release line is attached to the center line and then to the riser. The release line is shorter in length than the combined length of the length of the tow line, the crown lines, the length of the portion of canopy that is in between the tow line and the lower parachute lines, and the length of one lower parachute line.

The release line is configured to actuate release 2104 under a second threshold force. Some examples of the release are described in more detail with respect to FIGS. 15A to 18B. In some embodiments, the second threshold force is lower than the first threshold force (e.g., the first threshold force is the force to release the lower parachute line restrainer). In some embodiments, actuation of the release allows the parachute and rocket to separate with little or no recoil.

FIG. 21E is a diagram illustrating an embodiment of a parachute deployment system following separation of the parachute from the rocket. In this example, as part of the actuation of the release, each of the crown lines individually release to minimize mass inhibiting inflation of the parachute. Although line constrainer 2120 is shown attached to the release here, in other embodiments, the line constrainer may simply detach and fall off. In the example shown, the rocket remains tethered to the release. The rocket and release are separated from the parachute and payload. In various embodiments, the release line and crown (tow) line remain attached to the canopy of the parachute. In some embodiments, the canopy completely fills following separation from the rocket as shown in FIG. 21F.

Although in this example, crown lines 2108 are pictured as being relatively short, the crown lines may instead be sized of sufficient length to allow full deployment of the parachute canopy without being constrained by the crown lines. For example, when the rocket and/or release malfunctions (e.g., rocket fails to release), the canopy is able to completely fill because the crown lines are of sufficient length to allow the canopy to fully open. When a rocket release failure is detected, a line constrainer (if one is used) slips axially upward to the top of the crown lines, and crown lines are permitted to extend to full length to facilitate full filling of the canopy. In other words, the crown lines extend without interfering with full inflation of the canopy.

FIG. 21F is a diagram illustrating an embodiment of a parachute deployment system with a fully deployed parachute. The end of parachute extraction is sometimes called an "end stroke," and the beginning of the parachute falling is called a "down stroke." FIG. 21E shows a parachute end stroke, and FIG. 21F shows a parachute down stroke. There is little or no recoil on the end stroke. The line constrainer allows the level of damping of the end stroke to be controlled. In various embodiments, the release line 2114 and crown (tow) lines 2108 remain attached to the canopy 2110 of the parachute as shown.

In some embodiments, the extent to which crown lines are able to extend away from a longitudinal axis of a parachute of a parachute deployment system can be limited without a line constrainer. For example, fixed crown line lengths produce a desired cross-sectional area without needing to provide a line constrainer.

Figure 23:
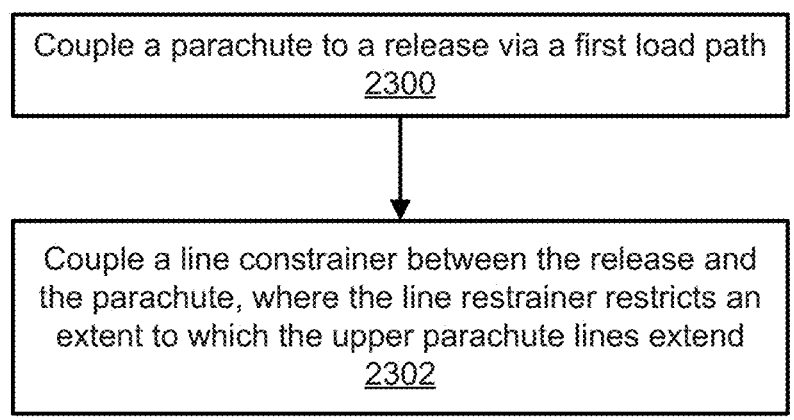
FIG. 23 is a flow diagram illustrating an embodiment of a process to manufacture a parachute deployment system including a line constrainer.

FIG. 23 is a flow diagram illustrating an embodiment of a process to manufacture a parachute deployment system including a line constrainer. The process can be implemented by a parachute deployment system assembler, such as a programmed robotic arm or by manual efforts. The process can be used to manufacture a parachute deployment such as the one shown in FIGS. 19A and 19B.

At 2300, a parachute is coupled to a release via a first load path. Referring to FIG. 19A, parachute 1910 is coupled to release 1904 via a first load path. The first load path is made up of crown lines 1908. The parachute can be removably coupled to the release such that the parachute is separated from the release (and rocket) during parachute deployment as described here. Examples of the release are shown in FIGS. 15A-18B.

In various embodiments, coupling the parachute to the release includes assembling a parachute system (such as the one shown in FIGS. 19A and 19B) for extraction via a load path through the upper parachute lines, canopy, and suspension lines, and for release via a release line. The release line length may be tuned so that substantially all tension is taken through the release line when the extraction load path is unconstrained. The suspension line restrainer size can be tuned to leave ample slack in the release line when the extraction load path is under tension.

Returning to FIG. 23, at 2302, a line constrainer is coupled between the release and the parachute. The line constrainer restricts an extent to which crown lines are able to extend away from a longitudinal axis of the parachute. The extension of the crown lines can be selected based on a desired level of extension damping. As more fully described with respect to FIGS. 19A and 19B, greater extension of the crown lines corresponds to greater extension damping. In various embodiments, the line constrainer includes grommets through which crown lines are extended. One end of the crown lines is coupled to the release, and the other end of the crown lines is coupled to the canopy of the parachute.

The line restrainer is installed on the upper parachute lines above the canopy, where the line constrainer is able to restrict an extension of the upper parachute lines radially outward away from the longitudinal axis of the parachute system. In various embodiments, the components of the parachute system including the release are integrated with connections and ties prior to packing the parachute into a container/can.

In various embodiments, the parachute deployment system is packed into a can. The parachute is stored in an un-deployed state, and is extracted in the sequence shown in FIGS. 11A-11F or FIGS. 21A-21F. The parachute can be stored in a manner to promote quick inflation when deployed as described with respect to the following figures.

In various embodiments, the parachute deployment system has features to promote airflow through a top of the canopy to speed up inflation of the parachute and decrease recoil. Air inflow through the top (canopy) of the parachute helps the parachute inflate quickly once the downward stroke begins, without substantial dropping, by spreading the skirt during the extension stroke. The manner in which the parachute is packed into its can affects the speed of inflation. For example, a tightly packed and rolled parachute inflates slowly and results in more altitude loss during parachute inflation. The following figures illustrate examples of how air inflow is promoted by packing the parachute in the manner described.

Figure 24:
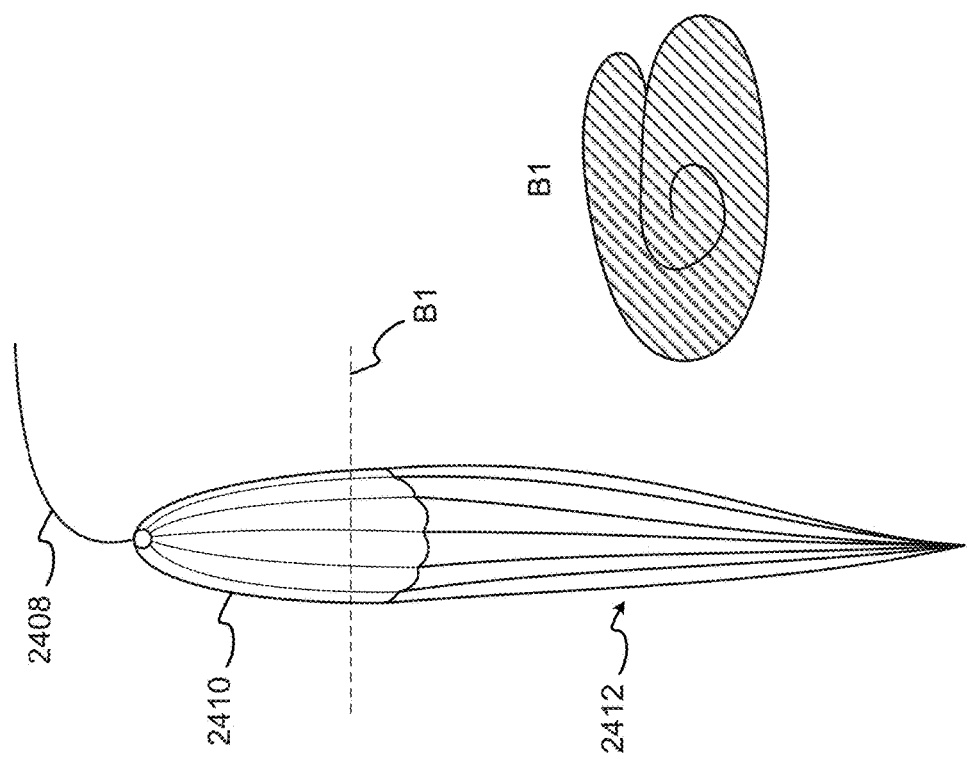
FIG. 24 is a diagram illustrating an embodiment of a conventional parachute in a conventional packed state.

FIG. 24 is a diagram illustrating an embodiment of a conventional parachute in a conventional packed state. In this example, the parachute includes upper parachute lines 2408, canopy 2410, and lower parachute lines 2412. The cross section at dashed line B1 is shown. The canopy may have vent lines or holes allowing air to pass through and provide stability while the parachute is in flight. During a packing process, the parachute is then compressed and rolled into a cylindrical shape (e.g., where the parachute is rolled up like a sleeping bag or cinnamon bun) as shown in B1 (i.e., so that the hem is no longer loose). Although this form of packing may be appropriate for conventional parachutes (e.g., without a line constrainer to constrain the upper parachute lines), this type of packing may be less than desirable for parachutes with a line constrainer. The following figure shows an alternative packing shape for such parachutes.

Figure 25:
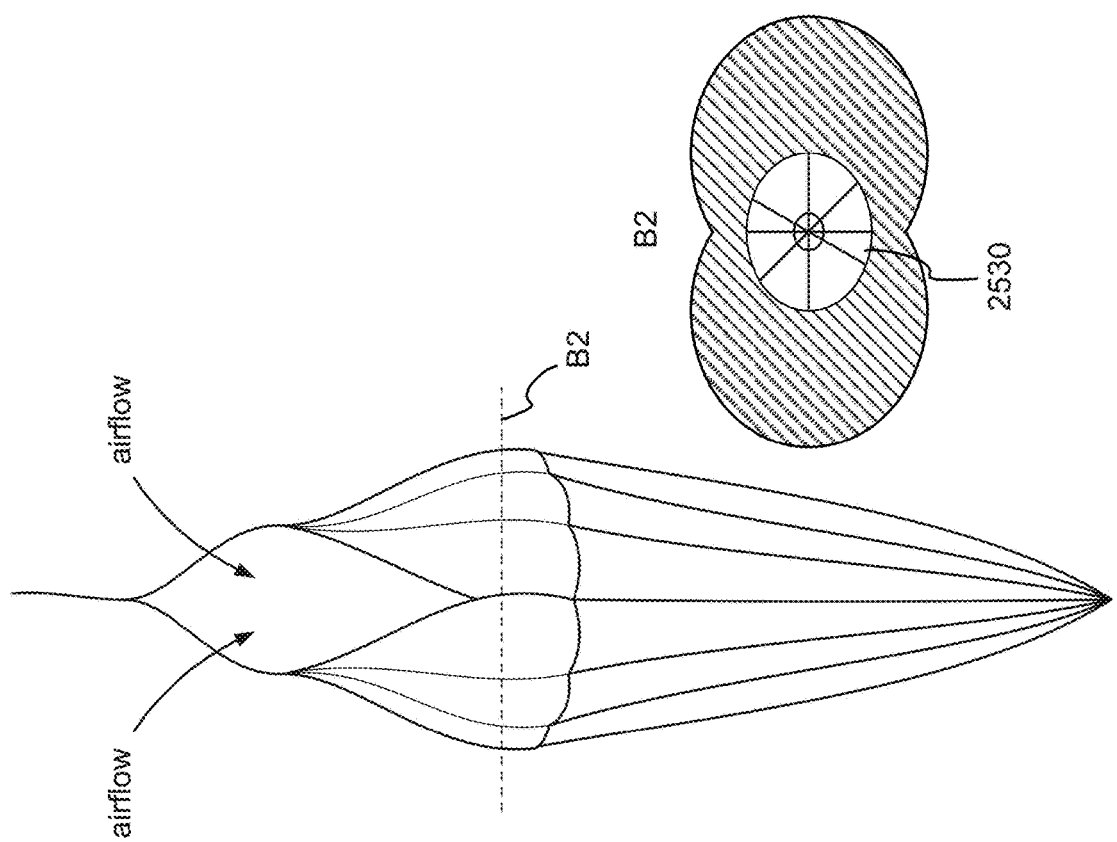
FIG. 25 is a diagram illustrating an embodiment of a parachute in a symmetrically packed state.

FIG. 25 is a diagram illustrating an embodiment of a parachute in a symmetrically packed state. Packing the parachute symmetrically is good for airflow down the center channel, symmetry as the parachute is extracted, and even loading as the parachute reaches full extension. Although not shown herein, in some embodiments the exemplary parachute system includes a line restrainer on its upper parachute lines. The cross section at dashed line B2 is shown. As shown, there is an opening 2530 that allows air inflow through the canopy. Due to the parachute moving through the air as it is extracted, air is pumped through the parachute through the crown (a center channel of the canopy) to facilitate inflation of the canopy as represented by the airflow arrows.

To help with airflow and more quickly inflate the parachute, the exemplary parachute is packed in an "M" cross-sectional shape designed to inflate quickly. The parachute is packed symmetrically with respect to a longitudinal axis of the parachute. Here, the longitudinal axis comes out of the page, and parachute material is evenly distributed about the axis to facilitate even loading upon extraction. By contrast, the packed parachute in FIG. 24 does not have an equal amount of material distributed around the longitudinal axis. Instead, most of the mass is on top of the longitudinal axis, because the location of the canopy apex is in the bottom layer of the rolled up parachute. Thus, when the parachute in FIG. 24 is extracted, loading is uneven and the parachute needs to unroll before air flows through a center channel of the canopy. This tends to make the inflation of the parachute relatively slow, uneven, and unsteady. To put it another way, instead of rolling the parachute (as shown in FIG. 24), the parachute is pulled and folded together evenly from all directions toward the longitudinal axis before being compressed in the can. In some embodiments, the hem remains loose rather than rolled into the folds of the parachute. This symmetric packing technique may be attractive for fast inflation when a vehicle is at low speed.

The rolling packing technique shown in FIG. 24 may be attractive when a vehicle is at high speed to slightly delay opening, keeping the fabric orderly until the parachute aligns with the airstream. This may reduce incidences of inversion of the canopy, particularly when parachutes are oriented in the cans/packs such that only a single gore is exposed to the airstream on extraction.

The following figures show examples of an exemplary parachute deployment system with locking stows at various points in time. This system is an alternative to the one with a slider release shown in FIGS. 21A-21F. This system may be particularly attractive for higher altitudes (for example above 100 ft) and for higher speeds (for example above 25 mph) because it allows greater altitude loss during parachute inflation before touchdown. The system does not require a release and accompanying components such as a release line and line constrainer.

The bag/sleeve shown in the following figures stays with the parachute canopy in the early stages of extraction and a riser line and suspension lines are pulled through a stow to separate the rocket from the canopy.

Figure 22A:
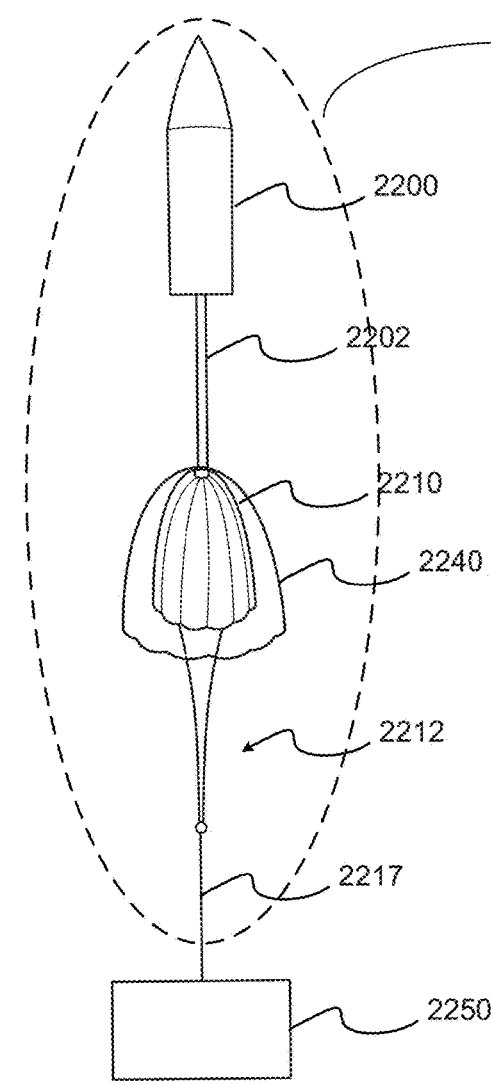
FIG. 22A is an exploded view illustrating an embodiment of a parachute deployment system with locking stows.

FIG. 22A is an exploded view illustrating an embodiment of a parachute deployment system with locking stows. Each of the lines are depicted as fully extended for purposes of clearly illustrating each of the parts. In various states of deployment as shown below, the lines may be folded. The system includes rocket 2200, rocket tow line 2202, parachute 2210, deployment bag or sleeve 2240, lower parachute lines 2212, riser 2217, and payload 2250 (such as the vehicle shown in FIG. 2). Each of the components are like their counterparts in FIG. 21A unless otherwise described.

Deployment bag 2240 is adapted to hold parachute canopy 2210. The parachute can be packed into the bag in a variety of ways including the examples shown in FIGS. 11A and 24-27. The canopy 2210 is secured inside the deployment bag using one or more locking stows in a way that the canopy does not initially fall out of the deployment bag. When rocket 2200 reaches a threshold distance from the payload, the rocket pulls suspension lines 2212 and riser 2217 so that they are extended, a flap in the bag opens, and the rocket and deployment bag separates from the canopy 2210.

The following figures show the portion of the system of FIG. 22A within the dashed oval to illustrate operation of the system.

Figure 22B:
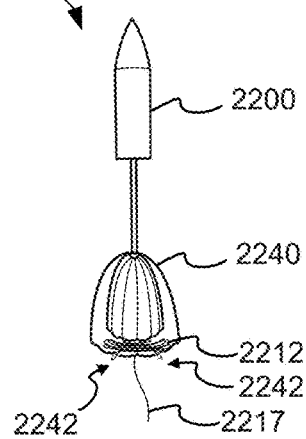
FIG. 22B is a diagram illustrating an embodiment of a parachute deployment system with locking stows when a rocket is initially deployed.

FIG. 22B is a diagram illustrating an embodiment of a parachute deployment system with locking stows when a rocket is initially deployed. Initially, lower parachutes lines 2212 are packed inside deployment bag 2240 while riser 2217 dangles from the flap enclosing the deployment bag. The lower parachute lines 2212 can be coiled and secured with rubber bands (as an example) using a variety of techniques to form a locking stow.

Rocket 2200 begins traveling away from deployment bag 2240 (here, substantially up), causing lower parachutes lines 2212 and riser 2217 to extend. The lower parachute lines can extend outside the bag via openings 2242. The openings form part of a locking stow that initially hold the canopy and at least a portion of the lower parachute lines inside the deployment bag. Later, when conditions are met, the locking stow will unlock and the bottom of the deployment bag will open to permit the bag and rocket to separate from the canopy. Conditions may include a threshold distance between the rocket and the payload or a known length of suspension lines having exited the bag. The locking stows can be designed with materials, dimensioning, etc. to unlock under desired conditions.

Figure 22C:
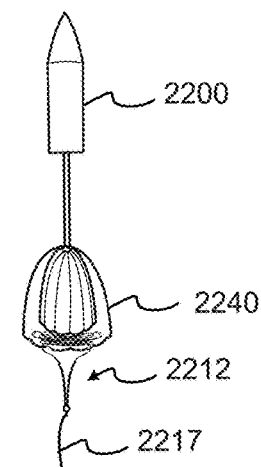
FIG. 22C is a diagram illustrating an embodiment of a parachute deployment system with locking stows during extraction.

FIG. 22C is a diagram illustrating an embodiment of a parachute deployment system with locking stows during extraction. In this state of deployment, rocket 2200 continues traveling away from the payload (here, substantially higher) compared with FIG. 22B. Consequently, lower parachute lines 2212 and riser 2217 are more extended. A portion of the lower parachute lines has been pulled through the openings of the deployment bag and are now outside deployment bag 2240. As the rocket travels farther away from the payload, locking stows begin to unlock/break. At least one of the locking stows remains locked in this state.

Figure 22D:
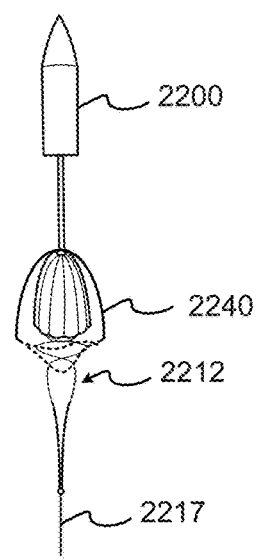
FIG. 22D is a diagram illustrating an embodiment of a parachute deployment system with locking stows at the later stages of extraction.

FIG. 22D is a diagram illustrating an embodiment of a parachute deployment system with locking stows at the later stages of extraction. In this state of deployment, rocket 2200 continues traveling away from the payload, and the final locking stow has broken free creating an opening in the deployment bag to allow the canopy to begin exiting from the bag. The dashed portion of the deployment bag is a flap that initially (FIG. 22B) covers the opening of the bag and now is dangling from a portion of the bottom of the bag. Rocket 2200 will continue to travel away from the payload to continue extending the lower parachute lines 2212 and riser 2217. The extending lower parachute lines and riser pull the canopy away from the deployment bag 2240.

Figure 22E:
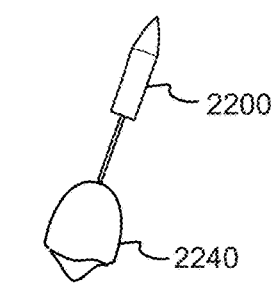
FIG. 22E is a diagram illustrating an embodiment of a parachute deployment system with locking stows after the rocket separates from the parachute.
Figure 22E:
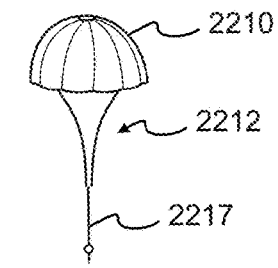

FIG. 22E is a diagram illustrating an embodiment of a parachute deployment system with locking stows after the rocket separates from the parachute. In this state of deployment, rocket 2200 and deployment bag 2240 have separated from the canopy. Canopy 2210 of the parachute is fully inflated, parachute lines 2212 and riser 2217 are pulled taut, and the canopy is arresting the fall of payload (2250 of FIG. 22A).

This extraction technique can be used in combination with other ones like the one described in FIGS. 21A-21F. For example, one (or more) parachute(s) in a multi-parachute system can be extracted this way while other ones of the multi-parachute system are extracted using other techniques. A first or drogue parachute may be extracted using this technique because the aircraft is at a relatively higher altitude and speed, and when the aircraft is at a lower altitude and speed the extraction technique described in FIGS. 21A-21F may be more attractive.

The following figures show an example of a canister in which parachutes are packed. The canister contains a deployment bag or sleeve 2240. The soft pack can be embedded behind the cockpit of a multicopter as shown in FIG. 6.

FIG. 26 is a diagram illustrating an embodiment of a soft pack container for a parachute. This soft pack container may be attractive for a variety of reasons including being able to reduce the packed volume of a parachute and maintaining pressure on the packed parachute without interfering with the extraction process, being easy to mount on a vehicle, and being more durable and less likely to be damaged because metallics are separated from the parachute.

The soft pack container is made of a soft material (unlike hard-sided containers such as metal or hard plastic canisters), which allows pressure to be maintained on the packed parachute using lacing system 2650. The container has four side walls and a bottom forming a cavity 2610 to receive a parachute. The four side walls and bottom can be one or more separate fabric panels stitched together at the seams as shown. The top of the container has four flaps that can be folded over and slightly overlapped to enclose the cavity 2610. The flaps can be held in place using a locking stow (not shown), which is further described in FIG. 27. In the state shown, each of the flaps (an exemplary one is flap 2614) is folded down so that the top is open and the cavity is exposed.

The container includes a lacing system 2650, which is shown here without the lace. The eyelets are configured to receive the lace, which can be passed through the eyelets to compress the soft pack to a desired size. Unlike a hard canister whose walls do not yield to compression, the soft pack shown here can maintain a tight pack volume by cinching the pack using the lacing system to a desired volume. When a rocket is deployed, the parachute can be pulled through the pack when conditions are met to unlock the locking stow as further described in FIG. 27. This allows the parachute to be easily extracted. In addition, a locking stow for closing the flaps can also help to maintain pressure on the pack.

The container includes mounting grommets (shown in FIG. 27), which allow the container to be mounted to a vehicle such as the one shown in FIG. 2. The container also includes a pocket 2604. Components of the parachute system that might damage the canopy such as metallic, release devices, and the like can be separated from the canopy by being placed in the pocket to avoid damaging the canopy. The lacing system and pocket can be placed on any side of the pack and their example positions here are not intended to be limiting.

Some elements of the soft pack are not shown here for purposes of more clearly illustrating the container. The following figure shows the soft pack container with a parachute packed inside and rocket attached. The system is ready for deployment, and can be provided in an aircraft as shown in FIG. 2.

FIG. 27 is a diagram illustrating an embodiment of a soft pack container for a parachute in a packed state. Each of the components are like their counterparts in FIG. 26 unless otherwise described. Here, the parachute is inside the cavity formed by the walls of the soft pack and secured in place by the folded flaps 2710, 2712, 2714, and 2716 via a locking stow 2742. The locking stow may be implemented in the same way as the locking stows described elsewhere in this disclosure. A lace can be threaded through the eyelets to form lacing system 2750 as shown. The lacing system can be tightened or loosened depending on a desired amount of pressure or packed size. Mounting grommets 2706, 2708, and 2728 can be used to attach the soft pack to a vehicle.

In this example, a rocket 2700 is attached to the soft pack via a bridle 2702. During an extraction process such as the one shown in FIGS. 22A-22E, the rocket deploys away (e.g., upwards), pulling the bridle and with it the contents of pocket 2704. When the rocket reaches certain conditions such as when a threshold force is exerted, the locking stow unlocks and the parachute is extracted from the soft pack.

The various embodiments of the disclosed system are capable of recovering a payload (e.g., an attached aircraft or person) at low altitude and low speed conditions and are also adaptable to high speed or high altitude conditions. The parachute deployment system tolerates high loads during initial extraction of the parachute, but actuates release of the rocket with a low load and low recoil. The disclosed system may be packed into a small space and is low in mass. In some embodiments, the disclosed parachute deployment system tolerates chaotic extraction and is agnostic to rotation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to deploy a plurality of parachutes, comprising:
   a first parachute canopy and a second parachute canopy packed respectively in an associated first canister and an associated second canister, wherein the plurality of parachutes includes the first parachute canopy and the second parachute canopy;
   a first rocket adapted to extract the first parachute canopy from the associated first canister and a second rocket adapted to extract the second parachute canopy from the associated second canister; and
   a controller configured to:
      determine whether an aircraft is in a hover mode of operation;
      determine whether the aircraft is in a forward flight mode of operation and above a threshold airspeed;
      in response to the determination that the aircraft is in the hover mode of operation, apply a hover deployment sequence including instructing the first rocket to extract the first parachute canopy from the associated first canister and the second rocket to extract the second parachute canopy from the associated second canister simultaneously; and
      in response to the determination that the aircraft is in the forward mode of operation and above the threshold airspeed, apply a forward deployment sequence including instructing the first rocket to extract the first parachute canopy from the associated first canister before the second rocket extracts the second parachute canopy from the associated second canister.

2. The system of claim 1, wherein the controller is configured to instruct the first rocket and the second rocket to deploy such that the aircraft does not exceed a threshold impact velocity.

3. The system of claim 1, wherein the system is provided behind a cockpit of the aircraft.

4. The system of claim 1, wherein the first parachute canopy is a drogue parachute canopy.

5. The system of claim 1, wherein each of the first parachute canopy and the second parachute canopy is connected by an independent line to a connection point behind a headrest in a cockpit of the aircraft.

6. The system of claim 5, wherein the connection point is part of a frame of a fuselage.

7. The system of claim 1, wherein: (1) the first canister associated with the first parachute canopy, (2) the second canister associated with the second parachute canopy, and (3) an additional canister are arranged in a triangular formation with one of the canisters in the triangular formation positioned closer to a tail of the aircraft than the other two canisters in the triangular formation.

8. The system of claim 1, wherein:
the first parachute canopy is coupled to the first rocket via a first load path, the first load path including a tow line, at least one upper parachute line, at least one lower parachute line, and a second load path including a release line; and
the first rocket is adapted to tow the first parachute canopy via the tow line.

9. The system of claim 8, further comprising a lower parachute line restrainer which when released permits the at least one lower parachute line to extend to full length.

10. The system of claim 8, further comprising a release configured to open in response to a load switching from the first load path to the second load path, wherein when the release is open, the first parachute canopy and the first rocket are permitted to separate.

11. The system of claim 1, wherein the first canister includes a deployment bag with a locking stow adapted to close one or more flaps of the deployment bag and the locking stow is configured to unlock, permitting the first parachute canopy to separate from the deployment bag.

12. The system of claim 1, wherein the first canister includes a deployment bag, including:
a lacing system adapted to maintain pressure on the deployment bag;
a pocket adapted to separate the first parachute canopy stored in the deployment bag from one or more other components in the deployment bag; and
at least one mounting grommet for attaching the deployment bag to the aircraft.

13. A method to deploy a plurality of parachutes, comprising:
receiving, at a controller, an indication to deploy a parachute system from a flight computer;
determining, at the controller, whether an aircraft is in a hover mode of operation;
determining, at the controller, whether the aircraft is in a forward flight mode of operation and above a threshold airspeed;
in response to determining that the aircraft is in the hover mode of operation, apply a hover deployment sequence including instructing a first rocket to extract a first parachute canopy from an associated first canister and a second rocket to extract a second parachute canopy from an associated second canister simultaneously, wherein the plurality of parachutes includes the first parachute canopy and the second parachute canopy; and
in response to determining that the aircraft is in the forward mode of operation and above the threshold airspeed, applying a forward deployment sequence including instructing the first rocket to extract the first parachute canopy from the associated first canister before the second rocket extracts the second parachute canopy from the associated second canister.

14. The method of claim 13, wherein the flight computer determines the indication to deploy the parachute system based at least in part on an anticipated crash landing, hard landing, or fault.

15. The method of claim 13, further comprising determining that the aircraft is in the hover mode of operation based at least in part on the aircraft's airspeed being below the threshold airspeed.

16. The method of claim 13, further comprising determining that the aircraft is in the hover mode of operation based at least in part on the aircraft's forward speed or lateral speed being substantially zero.

17. The method of claim 13, wherein the forward deployment sequence includes:
deploying the first parachute canopy from the plurality of parachutes;
waiting for the aircraft to stabilize; and
deploying the second rocket associated with of the second parachute canopy from the plurality of parachutes, wherein a trajectory of the second rocket is configured to clear a vertical axis and the first parachute canopy under which the aircraft is hanging.

18. The method of claim 13, wherein all parachute canopies associated with the plurality of parachutes, including the first parachute canopy and the second parachute canopy, are fully extracted before any one is fully inflated.

19. A system to deploy a plurality of parachutes, comprising:
container means for holding a first parachute canopy and a second parachute canopy in a packed state respectively in an associated first canister and an associated second canister, wherein the plurality of parachutes includes the first parachute canopy and the second parachute canopy;
deployment means for extracting the first parachute canopy and the second parachute canopy from the container means, including a first rocket adapted to extract the first parachute canopy from the associated first canister and a second rocket adapted to extract the second parachute canopy from the associated second canister; and
controller means for:
determining whether an aircraft is in a hover mode of operation;
determining whether the aircraft is in a forward flight mode of operation and above a threshold airspeed;
in response to determining that the aircraft is in the hover mode of operation, applying a hover deployment sequence including instructing the first rocket to extract the first parachute canopy from the associated first canister and the second rocket to extract the second parachute canopy from the associated second canister simultaneously; and
in response to determining that the aircraft is in the forward mode of operation and above the threshold airspeed, applying a forward deployment sequence including instructing the first rocket to extract the first parachute canopy from the associated first canister before the second rocket extracts the second parachute canopy from the associated second canister.

* * * * *

UNITED STATES PATENT AND TRADEMARK OFFICE
CERTIFICATE OF CORRECTION

PATENT NO. : 11,273,919 B2
APPLICATION NO. : 16/560879
DATED : March 15, 2022
INVENTOR(S) : Craig Western et al.

It is certified that error appears in the above-identified patent and that said Letters Patent is hereby corrected as shown below:

In the Claims

In Column 34, Line 18, Claim 17, after "with", delete "of".

Signed and Sealed this
Fourteenth Day of March, 2023

Katherine Kelly Vidal
*Director of the United States Patent and Trademark Office*